United States Patent
Yin

(10) Patent No.: US 10,542,730 B2
(45) Date of Patent: *Jan. 28, 2020

(54) ANIMAL TRAINING SYSTEM

(71) Applicant: Sophia Yin, Davis, CA (US)

(72) Inventor: Sophia Yin, Davis, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/009,916

(22) Filed: Jun. 15, 2018

(65) Prior Publication Data

US 2019/0014745 A1   Jan. 17, 2019

Related U.S. Application Data

(60) Division of application No. 14/179,533, filed on Feb. 12, 2014, now Pat. No. 10,123,510, which is a continuation-in-part of application No. 12/433,877, filed on Apr. 30, 2009, now Pat. No. 8,869,748.

(60) Provisional application No. 61/889,022, filed on Oct. 9, 2013.

(51) Int. Cl.
*A01K 5/02* (2006.01)
*A01K 15/00* (2006.01)
*A01K 15/02* (2006.01)
*A01K 5/01* (2006.01)

(52) U.S. Cl.
CPC .......... *A01K 15/021* (2013.01); *A01K 5/0114* (2013.01); *A01K 5/02* (2013.01)

(58) Field of Classification Search
CPC .. A01K 5/0233; A01K 5/0275; A01K 5/0283; A01K 5/0291; A01K 15/00; A01K 15/02; A01K 15/021; A01K 29/00

USPC .................. 119/51.01, 51.02, 712, 719–721
See application file for complete search history.

(56) References Cited

U.S. PATENT DOCUMENTS

| | | | | |
|---|---|---|---|---|
| 4,517,923 A | * | 5/1985 | Palmer | G01G 17/08 119/51.02 |
| 6,041,737 A | * | 3/2000 | Hennigan | A01K 1/0107 119/161 |
| 6,349,671 B1 | * | 2/2002 | Lewis | A01K 5/0291 119/51.02 |
| 6,983,719 B2 | * | 1/2006 | Armstrong | A01K 5/02 119/169 |
| 7,124,707 B1 | * | 10/2006 | Clarke | A01K 5/0114 119/51.02 |
| 7,328,671 B2 | * | 2/2008 | Kates | A01K 15/02 119/719 |

(Continued)

*Primary Examiner* — David J Parsley

(57) ABSTRACT

A base of an animal training includes a dispenser that comprises a storage compartment configured to store rewards and to dispense rewards, a base signaling module configured to generate a reward signal, and a base wireless module configured to receive a dispense signal. A first target is detached from the base at a first target location at a first fixed distance from the base. The first target comprises a first target signaling module, a first sensor, and a first target wireless module. A second target is disposed at a second location, wherein the second location is a fixed distance from the base and comprises a second target signaling module, a second sensor, and a second target wireless module. The base further comprises a system configuration module, the system configuration module configured to access and modify configuration information of the dispenser, the first target, and the second target.

10 Claims, 18 Drawing Sheets

(56) References Cited

U.S. PATENT DOCUMENTS

| | | | | |
|---|---|---|---|---|
| 7,458,336 | B2* | 12/2008 | Eu | A01K 1/033 |
| | | | | 119/163 |
| 7,832,355 | B2* | 11/2010 | Mills | A01K 5/0114 |
| | | | | 119/51.02 |
| 7,895,973 | B1* | 3/2011 | Whelan | A01K 5/025 |
| | | | | 119/51.02 |
| 8,061,300 | B2* | 11/2011 | McElroy, Jr. | A01K 1/0107 |
| | | | | 119/164 |
| 8,869,748 | B2* | 10/2014 | Yin | A01K 15/021 |
| | | | | 119/51.02 |
| 10,123,510 | B2* | 11/2018 | Yin | A01K 5/02 |
| 2007/0295277 | A1* | 12/2007 | Kin | A01K 5/0275 |
| | | | | 119/51.02 |

* cited by examiner

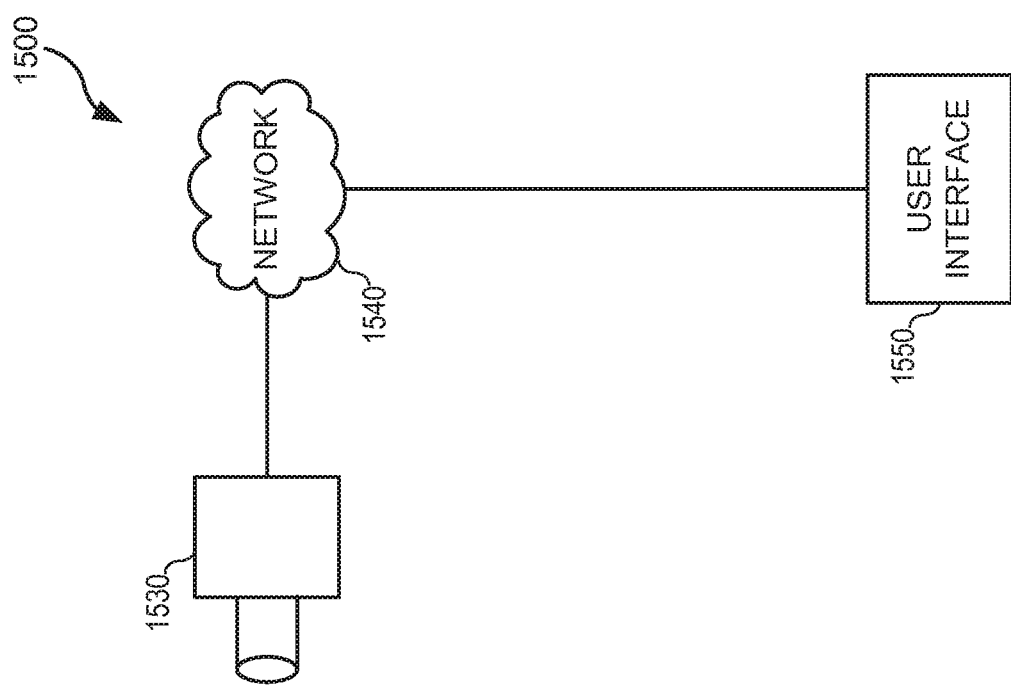
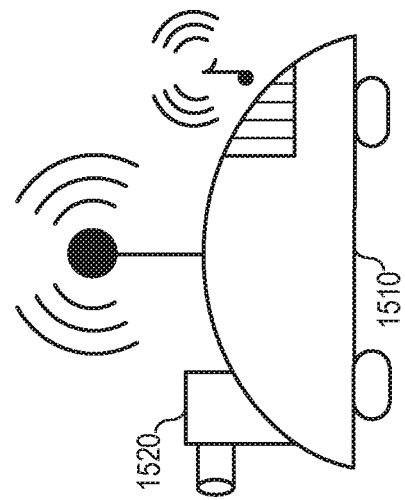
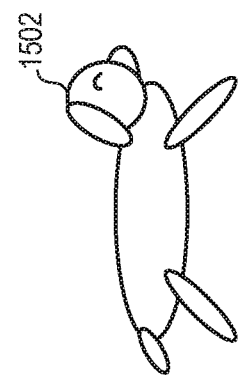
FIG. 15

ANIMAL TRAINING SYSTEM

CROSS REFERENCE TO RELATED APPLICATIONS

The present U.S. Utility Patent Application claims priority pursuant to 35 U.S.C. § 121 as a divisional of U.S. Utility application Ser. No. 14/179,533, entitled "ANIMAL TRAINING SYSTEM", filed Feb. 12, 2014, which is a continuation-in-part of U.S. Utility patent application Ser. No. 12/433,877, entitled "SYSTEM AND METHOD FOR TRAINING AN ANIMAL", filed Apr. 30, 2009, now U.S. Pat. No. 8,869,748, issued on Oct. 28, 2014, and claims priority pursuant to 35 U.S.C. § 119(e) to U.S. Provisional Application No. 61/889,022, entitled "Animal Training System", filed Oct. 9, 2013, all of which are hereby incorporated herein by reference in their entirety and made part of the present U.S. Utility Patent Application for all purposes.

BACKGROUND

1. Technical Field

The present invention relates to training devices and, more particularly, training devices for training animals.

2. Related Art

Training animals and providing exercise for the animal that is home alone often includes using objects that require the animal to initiate movement or interaction with the device, such as a ball or toy mouse. Animals often become bored because the device does not provide a new or exciting activity in which the animal participates, even for systems that can offer activities at any time, but must be initiated by the animal. Therefore, there is a need for a device or method capable of training and entertaining an animal without requiring the animal to initiate the interaction.

There are prior art devices that provide a food incentive to encourage the animal to participate with the device. However, these devices also require the animal to wear a proximity sensor to indicate that the animal is nearby. As such, these devices do not solve the problem of waning animal interest. The animal must still be interested enough in the device to approach within the proximity sensor's detection zone. If the animal loses interest in the device, there is no incentive for the animal to approach and continue playing. Once the animal has become bored, and the animal no longer goes near the device, the device is no longer able to stimulate and entertain the pet. Therefore, there is a need for a device that can train and entertain the animal without requiring the animal to show an initial or continuing interest in the device.

Other modern devices utilize small attachments that launch from the device. These devices entertain the animal by launching attachments for the animal to chase and catch. Unfortunately, these devices are prone to jamming or the loss of the attachments. Further, even if the attachments are not lost, the devices often require the owner to be present in order to activate the device. Therefore, there is a need for a device that can train and entertain an animal without the presence of the owner, or the use of small, easily losable attachments.

Therefore, there is a need for an entertainment and training device that can continually keep the animal entertained beyond the period in which the animal has interacted with the device to the point of becoming bored and that addresses at least some of the problems and disadvantages associated with conventional systems and methods.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

FIG. 15 illustrates a high-level block diagram showing an animal training system in accordance with one embodiment.

DETAILED DESCRIPTION

The particular values and configurations discussed in these non-limiting examples can be varied and are cited merely to illustrate at least one embodiment and are not intended to limit the scope of the invention. While numerous specific details are set forth to provide a thorough understanding of the present invention, those skilled in the art will appreciate that the present invention may be practiced without such specific details. In other instances, well-known elements have been illustrated in schematic or block diagram form in order not to obscure the present invention in unnecessary detail. Additionally, many modifications and variations will be apparent to one of ordinary skill in the relevant arts.

Generally, the embodiments of the present invention are directed to exercise, enrichment of the animal's home alone experience, and training. Training has a goal of teaching discrimination behaviors such as teaching scent discrimination for scent dogs and teaching alerting behaviors to hearing dogs or other assistance dogs. Training may also be for behavior modification of problem behaviors such as training alternative appropriate behaviors to replace unwanted behaviors such as barking at the door when someone knocks or rings the doorbell. Additionally, training may also be for teaching more positive emotional states for cases where the dog may become anxious or fearful: such as at hearing the doorbell, fireworks, thunderstorms. Finally, it may be desirable to teach an animal such as a dog to run to location (such as to safety outside) in different cued situations. The various embodiments of the invention described below assist with these various goals.

Figure 1:
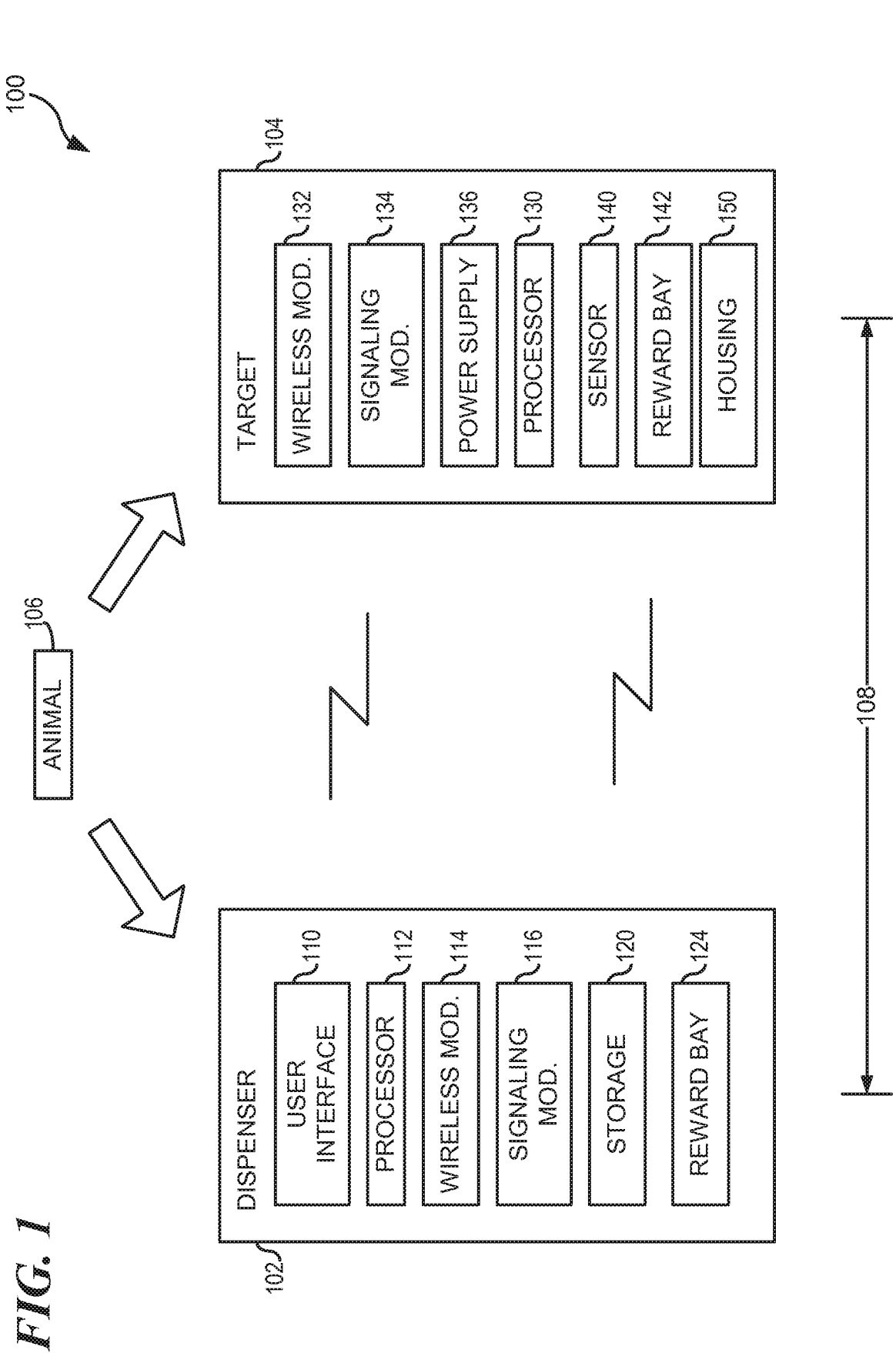
FIG. 1 illustrates a high-level block diagram showing an animal training system in accordance with one embodiment.

Referring now to the drawings, FIG. 1 illustrates a high-level block diagram of a system 100 for training and entertaining an animal. In accordance with one embodiment, system 100 comprises a dispenser 102 and a target 104. Very generally, in one embodiment, an animal 106 activates a sensor of target 104, which signals to dispenser 102 to emit a signal recognizable to the animal, and dispense a food reward within a fraction of a second for the animal 106. Animal 106 moves back and forth between dispenser 102 and target 104 as system 100 generates various stimuli and rewards, as described in more detail below.

As illustrated, animal 106 is depicted as a generic block. One skilled in the art will understand that animal 106 can be any animal suitable for training, including birds, cats, dogs, horses, etc. However, for ease of illustration, the various embodiments described herein will be discussed with respect to training and/or entertaining dogs.

Additionally, the animal rewards described herein are food rewards. Generally, food rewards are rewards the animal enjoys eating. In one embodiment, the food rewards are dispensed in small amounts. In one embodiment, the food rewards are smaller than snack size for the animal. In one embodiment, the food rewards are training size. In one embodiment, the food rewards are of a size such that the caloric value of the reward is less than or equal to the energy expended by the animal in earning the food reward. As used herein, "reward" or "rewards" means "food reward" or "food rewards."

Generally, a trainer places dispenser 102 in a location accessible to animal 106. A trainer places target 104 a fixed distance 108 from dispenser 102. In one embodiment, a trainer sets fixed distance 108 based on relevant training conditions. Generally, relevant training conditions include the area of the space in which the animal resides, the age and fitness level of the animal, the desired amount of exercise for the animal, the stage of training, the animal's experience with the training, the amount of food the dog has already eaten that day (i.e., that dog's satiation level), and other suitable factors.

In the illustrated embodiment, dispenser 102 includes a user interface 110 and a processor 112. As described in more detail below, user interface 110 is configured to receive user input comprising a system configuration. In one embodiment, the system configuration includes a training program, a session length, and a periodicity. Processor 112 is an otherwise conventional processor, configured as described herein. In one embodiment, processor 112 comprises a sleep mode circuit configured to place dispenser 102 in a low-power state after a predetermined period of inactivity.

Dispenser 102 also includes wireless module 114 and signaling module 116. Generally, wireless module 114 couples to processor 112 and is configured to send and receive wireless transmissions including a dispense signal and an attention signal, described in more detail below. Generally, signaling module 116 couples to processor 112 and is configured to generate a reward signal (an audible tone or visual light) detectable by animal 106, described in more detail below. In one embodiment, signaling module 116 is a speaker. In an alternate embodiment, signaling module 116 is a light emitting diode (LED). In one embodiment, signaling module 116 includes a speaker and an LED. In one embodiment, the LED is bright blue. In one embodiment, the reward signal is an audible (to the animal 106) tone or other sounds. In an alternate embodiment, the reward signal is a flashing light, an LED light, or other visual cue. In an alternate embodiment, the reward signal is an audible tone and a visible light.

In the illustrated embodiment, dispenser 102 includes storage 120 and reward bay 124. Generally, storage 120 is a storage area or receptacle configured to store food reward units for subsequent dispensation to animal 106. In one embodiment, the reward units are small bits of food desirable to animal 106. Generally, reward bay 124 couples to storage 120 and is configured to dispense discrete amounts of food reward units from storage 120 into a receptacle configured to allow access to animal 106. In a preferred embodiment, the discrete amount dispensed by reward bay 124 is 1 to 2 kibbles of food. In one embodiment, reward bay 124 includes a clearing mechanism, such as a motor reversal circuit, for example, configured to clear jammed food reward units. As described above, in one embodiment, dispenser 102 dispenses a food reward in response to a dispense signal from target 104.

In the illustrated embodiment, target 104 includes processor 130, wireless module 132, and signaling module 134. Processor 130 is an otherwise conventional processor, configured as described herein. In one embodiment, processor 130 comprises a sleep mode circuit configured to place target 104 in a low-power state after a predetermined period of inactivity.

Generally, wireless module 132 couples to processor 130 and is configured to send and receive wireless transmissions including a dispense signal and an attention signal, described in more detail below. Generally, signaling module 134 couples to processor 130 and is configured to generate a trigger signal detectable by animal 106, described in more detail below. In one embodiment, signaling module 134 is a speaker. In an alternate embodiment, signaling module 134 is a light emitting diode (LED). In one embodiment, signaling module 134 includes a speaker and an LED. In one embodiment, the LED is bright blue.

In one embodiment, the trigger signal is an audible (to the animal 106) tone or other sounds. In an alternate embodiment, the trigger signal is a flashing light, an LED light, or other visual cue. In an alternate embodiment, the trigger signal is an audible tone and a visible light.

In the illustrated embodiment, target 104 includes power supply 136. Generally, power supply 136 provides power to the various elements of target 104. In one embodiment, power supply 136 comprises a battery compartment (not shown) and a power switch (not shown). In one embodiment, power supply 136 is configured to receive four conventional AA size batteries. In one embodiment, target processor 130 includes a sleep mode circuit to put target 104 in a low-power state, extending the energy stored in target power supply 136.

In the illustrated embodiment, target 104 also includes a sensor 140. Sensor 140 is an otherwise conventional sensor, such as a pressure sensor, for example. In an alternative embodiment, sensor 140 is a touch sensor configured to sense contacts made by a dog using its paw, nose, or any part of its body. In one embodiment, sensor 140 includes a piezoelectric element (not shown). The piezoelectric element mounts to the target housing beneath a dome shaped section piece of plastic membrane (not shown). When a dog makes contact with sensor 140, vibration produced during the impact passes to the piezoelectric element to generate an electric signal transmitted to processor 130. In one embodiment, sensor 140 is configured such that the arrangement of the piezoelectric element and the plastic membrane responds only to direct impact from a dog or cat, filtering out vibrations from other surrounding sources. In the illustrated embodiment, target 104 also includes a reward bay 142, described in more detail below. Generally, reward bay 142 is a receptacle formed from a housing of target 104, and is configured to receive a food reward and to allow access by animal 106. As described in more detail below, an animal 106 may need encouragement to recognize target 104, in which case placement of a small food reward in reward bay 142 can motivate animal 106 to approach target 104. In an alternate embodiment, target 104 includes a plurality of reward bays 142. In one embodiment, reward bay 122 also includes a grasping point configured for a human user to grasp and manipulate target 104.

In the illustrated embodiment, target 104 also includes a housing 150. Generally, housing 150 is constructed from durable, animal-resistant material and, in one embodiment, comprises a shape configured to cause an animal difficulty in picking up and/or moving target 104. In one embodiment, housing 150 is configured with a shape similar to an inverted soup bowl. Generally, the components of target 104 are disposed within and protected by housing 150.

Figure 2:
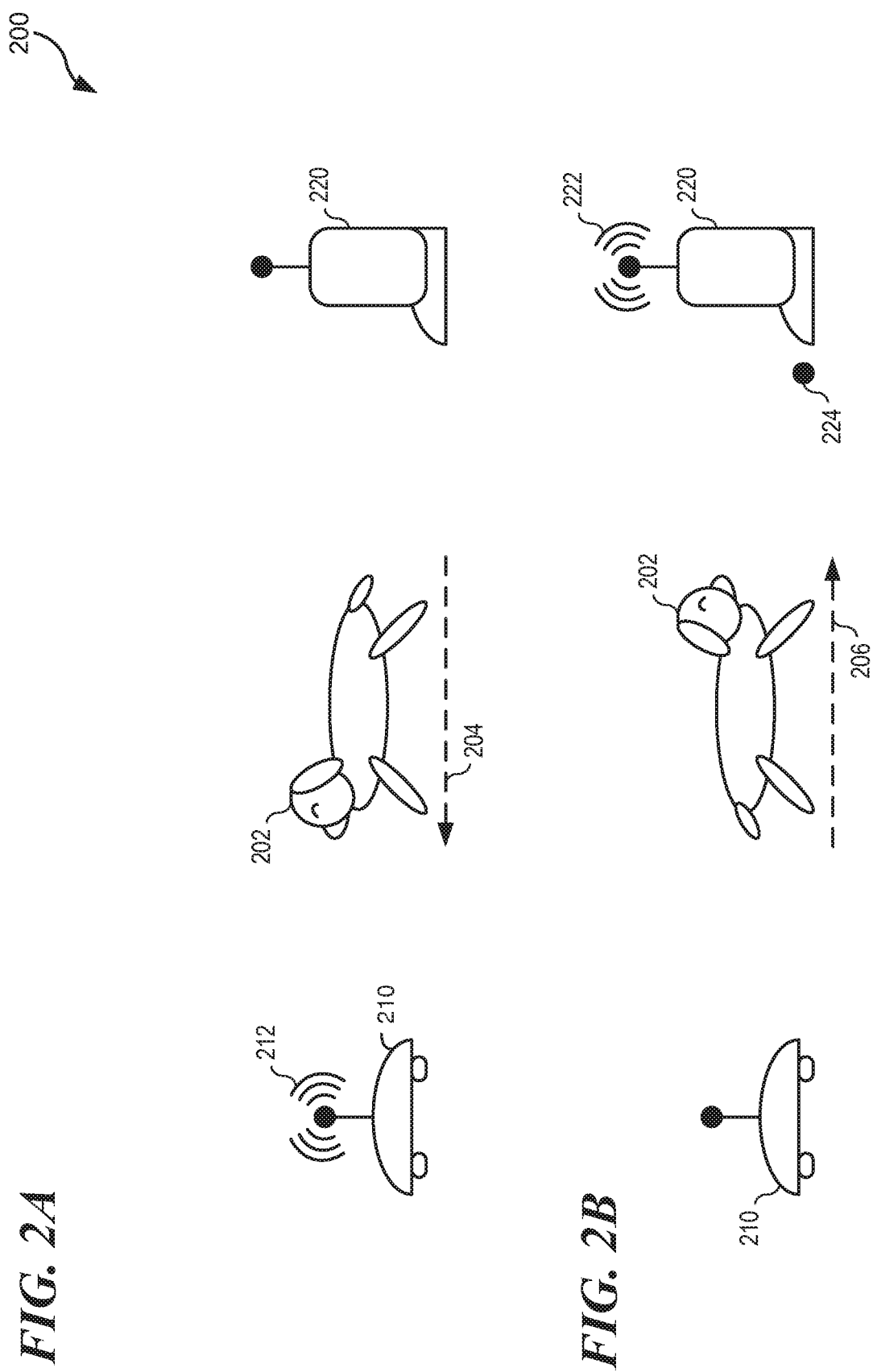
FIGS. 2A and 2B illustrate a high-level conceptual diagram illustrating training concepts in accordance with one embodiment.

FIGS. 2A and 2B illustrate an exemplary system 200 in operation. In the illustrated embodiment, a target 210 generates a trigger signal 212. Animal 202 learns to respond to trigger signal 212 by moving toward the target 210, in the direction shown by arrow 204, and taking certain actions. As described in more detail below, the actions animal 202 takes in response to trigger signal 212 will include a wide variety of behavior, of varying desirability. A user that is training animal 202 can select from a variety of predetermined animal behaviors that constitute a successful response to trigger signal 212. For example, in one embodiment, a predetermined animal behavior is a simple touch (with a nose or paw, for example) of target 210. Over time, animal 202 begins to associate the selected predetermined animal behavior with a reward, illustrated generally in FIG. 2B.

FIG. 2B illustrates the reward to animal 202 of a successful completion of the desired predetermined animal behavior. In the illustrated embodiment, a base station 220 generates a reward signal 222, indicating that it is dispensing a treat 224. Animal 202 learns to respond to reward signal 222 by moving toward base station 220, in the direction shown by arrow 206. Over time, the animal associates the predetermined animal behavior with the reward signal 222, and associates the reward signal 222 with the arrival of treat 224. This training principle serves (generally) as a foundation of the training methods encouraged by the disclosed embodiments, described in more detail below.

Figure 3:
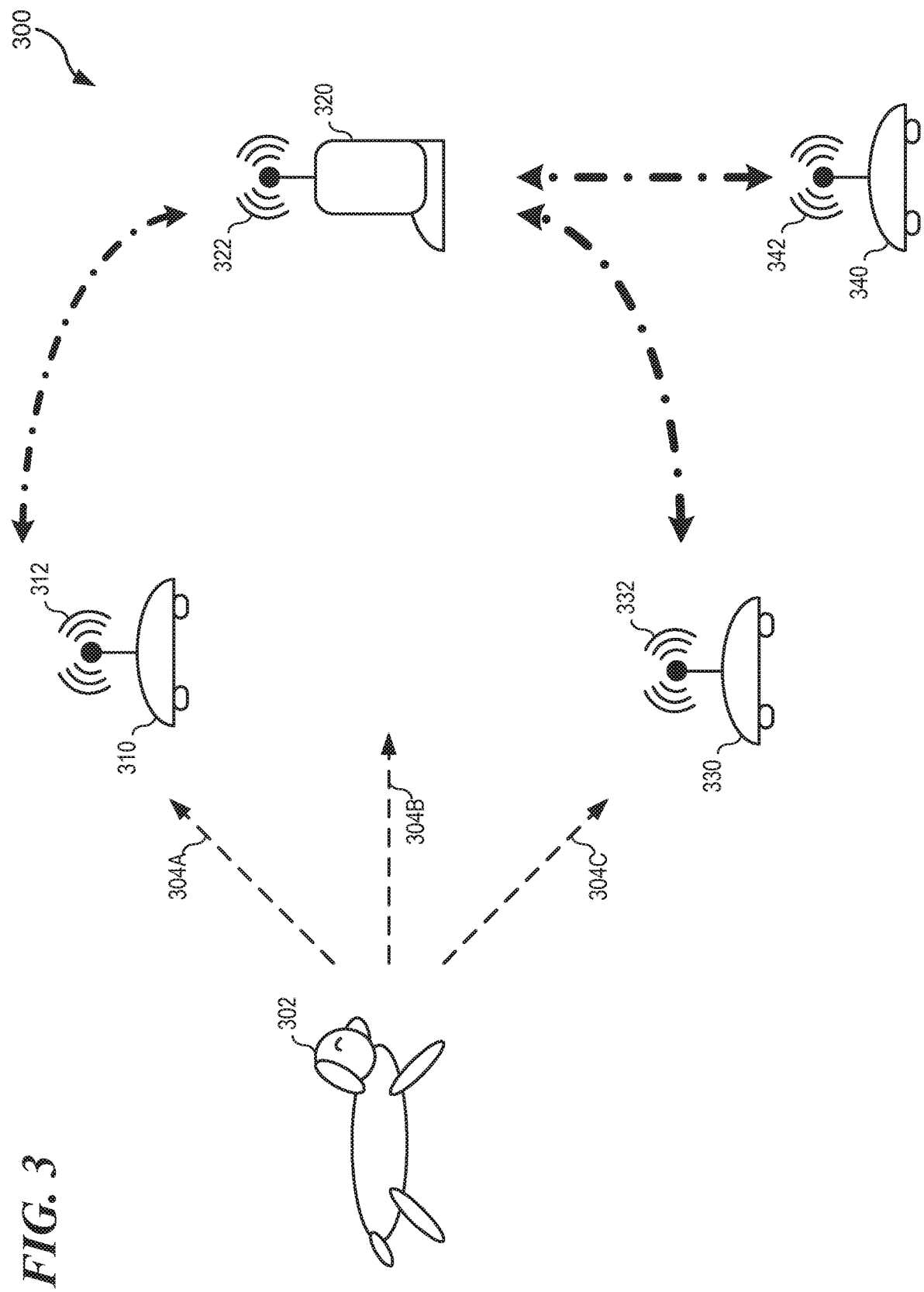
FIG. 3 illustrates a high-level block diagram showing an animal training system in accordance with one embodiment.

FIG. 3, for example, illustrates a high-level block diagram of a training system 300. In the illustrated embodiment, system 300 includes a base station 320 and a plurality of targets, represented by targets 310, 330, and 340. As described in more detail below, in the illustrated embodiment, base station 320 transmits activation signals 322 to any of the targets 310, 330, and 340. Similarly, each target 310, 330, and 340 sends a response signal back to the base station 320 (signals 312, 332, 342). Generally, these response signals 312, 332, and 342 serve as acknowledgement signals, dispense signals, and/or trigger signals.

Generally, acknowledgment signals sent to base station 320 confirm instructions or other information sent to the transmitting target. Generally, dispense signals sent to base station 320 indicate successful completion of a predetermined animal behavior. In some embodiments, base station 320 responds to the dispense signal by initiating a reward signal and treat dispensation. In other embodiments, base station 320 responds by initiating an activation signal to a target according to a target activation schedule.

In the illustrated embodiment, on receipt of an activation signal, each target activates a trigger signal and attempts to detect a predetermined animal behavior. For example, in one embodiment, target 310 receives an activation signal from base station 320 and issues a trigger signal 312. Over time, animal 302 learns to recognize trigger signal 312, to move toward target 310 (in the direction indicated by arrow 304A), and to perform a predetermined animal behavior. One skilled in the art will appreciate that associating in the animal's mind the trigger signal 312 with the desired behavior can be accelerated by special training sessions, described in more detail below.

Target 310 recognizes the predetermined animal behavior and responds according to various configuration setting, described in more detail below. For example, in one embodiment, target 310 issues an alert to animal 302 indicating the successful performance of the desired behavior. Additionally, in one embodiment, target 310 issues a dispense signal to base station 320. As described in more detail below, base station 320 issues a reward signal and dispenses a reward for animal 302. Over time, animal 302 learns to respond to a reward signal by moving toward base station 320 (generally in the direction indicated by arrow 304B) to retrieve the reward.

Similarly, in one embodiment, target 310 issues an activation signal to one or more other targets (e.g., targets 330, 340), which in turn issue trigger signals (e.g., signals 332, 342) that encourage animal 302 to perform a predetermined animal behavior (beginning with moving toward the target, as generally indicated by arrow 304C). In one embodiment, target 310 issues a dispensation signal to base station 320 and base station 320 issues subsequent activation signals. As described in more detail below, the sequence of target activation and reward can be customized in a variety of ways.

Figure 4:
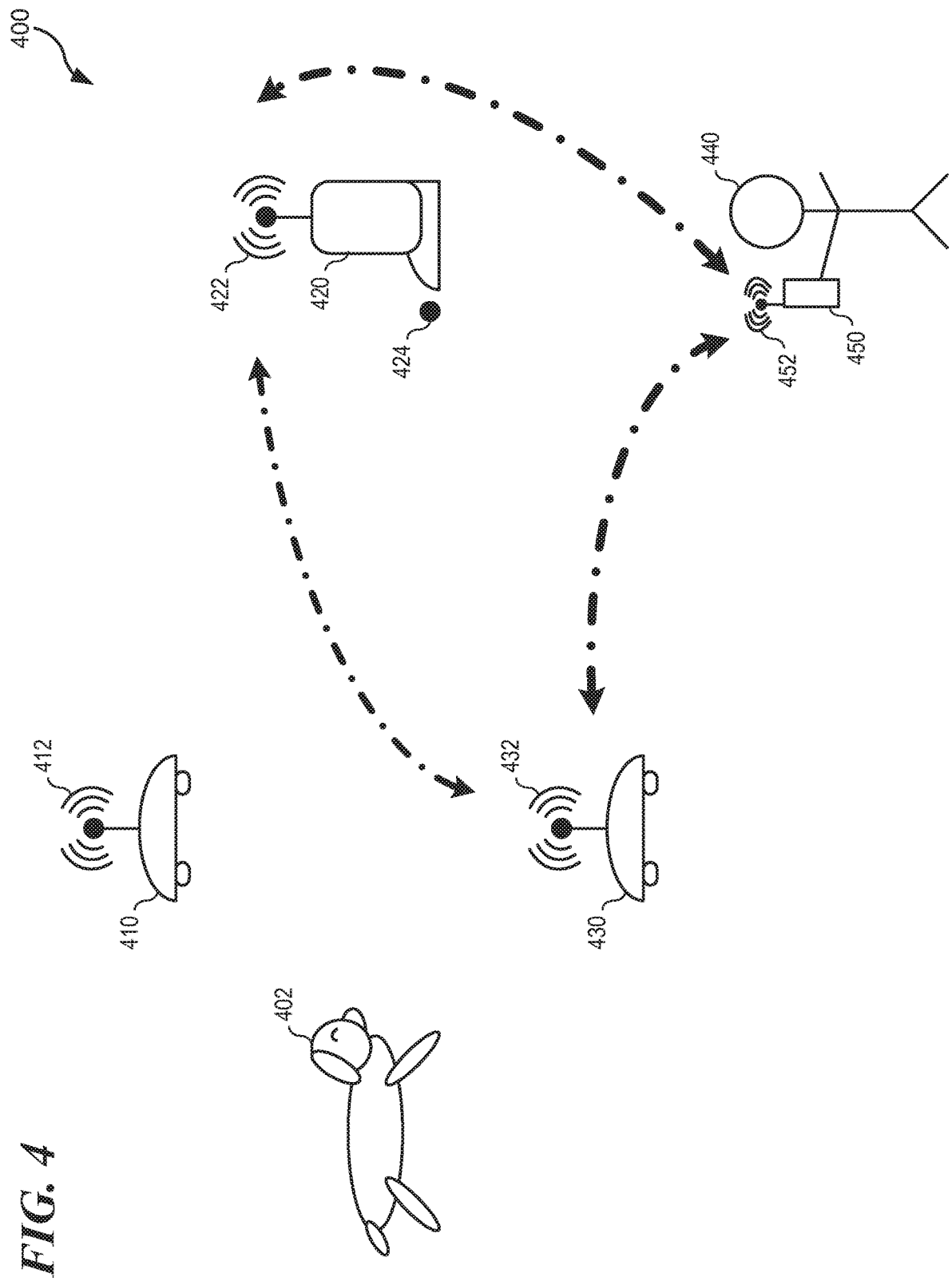
FIG. 4 illustrates a high-level block diagram showing an animal training system in accordance with one embodiment.

FIG. 4 illustrates a high-level block diagram of a training system 400. In the illustrated embodiment, system 400 includes a base station 420 and a plurality of targets, represented by targets 410 and 430. As described in more detail below, in the illustrated embodiment, base station 420 transmits activation signals 422 to any of the targets 410 and 430. Similarly, each target 410 and 430 sends a response signal back to base station 420 (signals 412, 432). Generally, these response signals 412 and 432 serve as acknowledgement signals, dispense signals, and/or trigger signals. So configured, system 400 can operate in a manner similar to that described above with respect to system 300 of FIG. 3.

In the illustrated embodiment, system 400 also includes a remote control 450. Generally, remote control 450 issues instructions to the various components of system 400, in response to input received from a user 400. Broadly, in one embodiment, remote control 450 allows a user 440 to select which target to activate, when to dispense a reward (and activate the reward signal), and whether the animal has performed the correct behavior at the targets.

Generally, system 400 offers more control over the activation of targets and also supports sophisticated training. For example, because the user 440 determines whether the animal has performed the desired behavior, the target itself can be configured without on-board sensors to detect animal behavior. As such, system 400 can be configured with basic targets having minimal functionality and/or additional durability during the period in which the animal is learning the desired behavior. Basic targets can therefore be constructed to endure biting and destructive behavior, while advanced targets (described in more detail below) can be constructed to provide advanced functionality.

Figure 5:
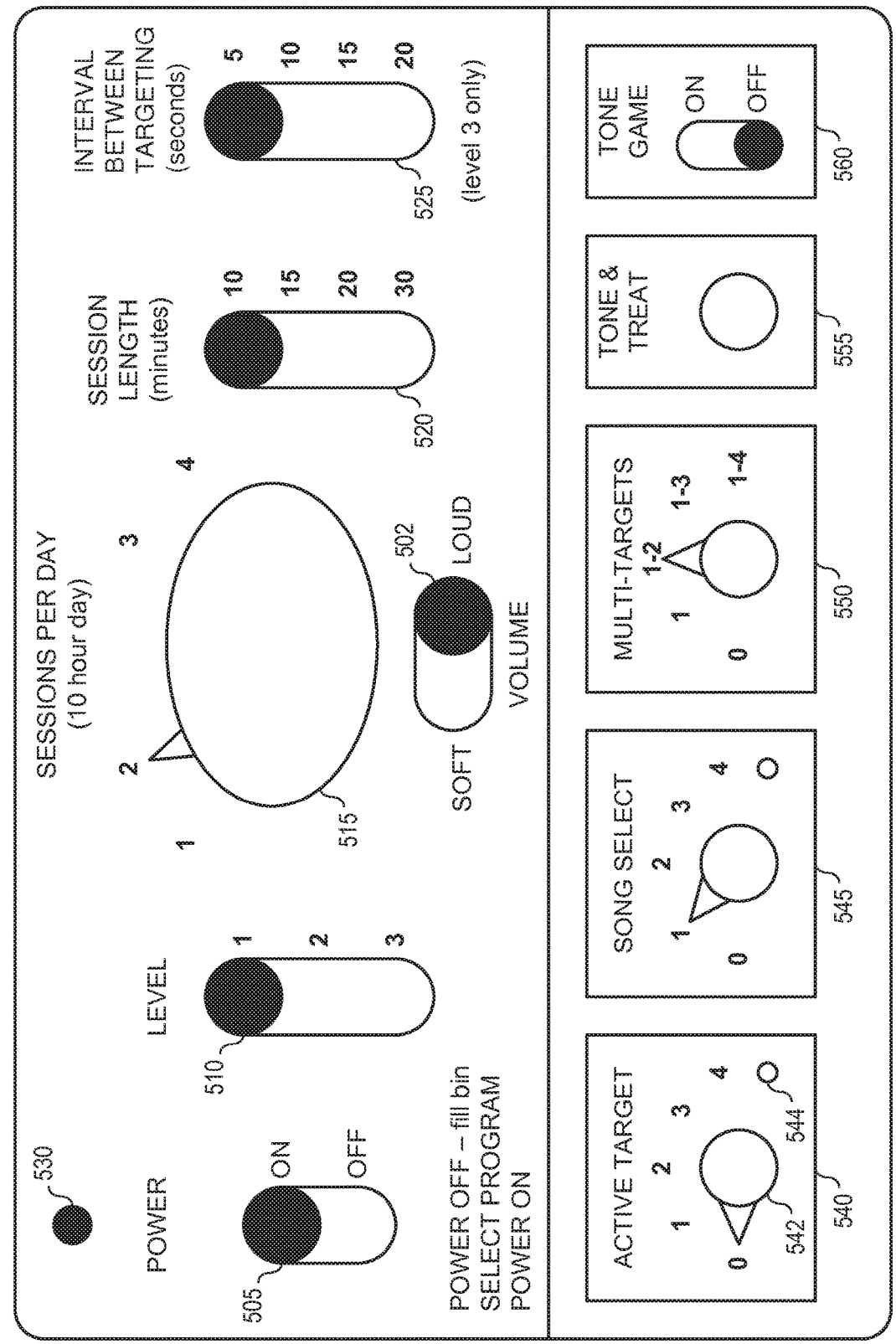
FIG. 5 illustrates an exemplary user interface in accordance with one embodiment.

Moreover, in one embodiment, user 440 can train an animal to perform a wide variety of desired behavior, such as, for example, pawing the target, sitting by the target, circling the target, following a certain path relative to the target, or any other behavior the trainer wishes to impress upon the animal. When the animal has learned the desired behavior, user 440 can use targets 410, etc. that include sensors configured to detect the desired behavior. In one embodiment, each target 410, 430, is configured to detect a plurality of predetermined animal behaviors. In one embodiment, one or more of target 410, 430, etc. are configured to detect a specific subset of predetermined animal behaviors. For example, where the predetermined animal behavior is pawing the target, the targets do not need sensors configured to detect sound. As such, the targets can be constructed to optimize costs versus expected functionality. As described above, some of the disclosed embodiments offer a variety of configuration operations. FIG. 5 shows an illustrative faceplate 500. Generally, the features of faceplate 500 can be distributed among the various components of an animal training system in a variety of ways. For example, in one embodiment, faceplate 500 is a component of a base station. In one embodiment, faceplate 500 is a component of a remote control. In one embodiment, faceplate 500 is a component of a target.

In the illustrated embodiment, faceplate 500 includes a volume control 502. Generally, volume control 502 is configured to allow the user to set a volume range of one or more of the audible signals of the animal training system, such as the trigger signal(s) and/or reward signal(s).

In the illustrated embodiment, faceplate 500 also includes a power switch 505, a training level switch 510, a sessions-per-day dial 515, a session length switch 520, a time-to-press-target switch 525, and a power indicator LED 530. One skilled in the art will appreciate that faceplate 500 can also include additional or fewer controls.

In the illustrated embodiment, training level switch 510 includes three settings. Each of the three settings corresponds to a different training level, as described in more detail below. Sessions-per-day dial 515 includes four settings, allowing the user to select from one active session per day up to four active sessions per day, as described in more detail below. Session length switch 520 includes four settings of ten minutes, fifteen minutes, twenty minutes, and thirty minutes, as described in more detail below. Time-to-press-target switch 525 includes four settings ranging in increments of five seconds beginning at five seconds and extending to twenty seconds, also described in more detail below.

In the illustrated embodiment, faceplate 500 also includes power indicator LED 530. Generally, power indicator LED 530 indicates whether the dispenser is turned on, has power, and/or whether there is an error condition, described in more detail below. So configured, faceplate 500 can serve as a user interface 110 of FIG. 1, for example.

As described above, system 100 of FIG. 1 can be configured to provide a highly customizable training system for an animal. For clarity, the follow discussion will refer to various features illustrated in FIG. 1 through FIG. 5. One skilled in the art will understand that the various components and features can be distributed among system 100 in a variety of ways.

The user (e.g., an owner and/or animal trainer) fills storage 120 with food rewards enjoyed by the animal. The user sets the system configuration by setting the switches on the user interface 110 (e.g., faceplate 500), including a training level, session length, and periodicity. The user can also set the desired speaker volume for the reward signal of the dispenser 102. When the user changes the speaker volume, signaling module 116 emits a tone at 440 Hz of that loudness.

Generally, the user presses the power button of user interface 110 to start the program. When the user presses the power button, a power indicator LED turns on, and remains on steady for the duration of the program. At the end of the program, the dispenser 102 turns the power indicator LED off and enters a low power state.

In one embodiment, system 100 supports three general training levels. In one embodiment, the user selects between three training levels though level switch 510. For the selected training level, the user selects, through switch 502, the speaker volume of the target-signaling module 134. The user switches on the power supply 136, through switch 505, and places the target(s) at a fixed distance from the base station dispenser 102. In one embodiment, when the user changes the speaker volume, signaling module 134 emits a tone at 440 Hz of that loudness.

For an exemplary first level training program, the dispenser 102 ignores the session duration and periodicity (and other) user interface switches, except the speaker volume. When the user presses the power button, the training program starts immediately. The target sets the trigger signal LED on the target to off for the duration of this program.

Any time the dog activates the target sensor, the target wirelessly sends a dispense signal to the dispenser. When the dispenser receives the dispense signal, the dispenser will, within 0.2 seconds of the target sensor being activated, emit a reward signal tone of 659 Hz for a duration of 0.5 seconds and the dispenser activates the reward signal LED for up to 3 seconds. The dispenser drops a food reward unit in the reward bay 124, within 0.3 seconds of the reward signal, and within 0.5 second after the dog activates the target sensor. Accordingly, the food reward unit is dropped within 0.5 seconds of the target sensor being activated.

In the event the storage 120 is empty or the reward bay 124 is jammed, the dispenser will emit no sound and will not attempt to drop a food reward until the owner presses the power button, which will blink 0.5 seconds on and 0.5 seconds off. In the event the reward bay 124 is jammed, the reward bay 124 motor will make one attempt to reverse itself to release the jammed food reward. If successful in releasing the food reward, the program resumes. In one embodiment, the system will beep repeatedly when jammed.

At the completion of the program duration, the system turns the power indicator LED off if the entire program was completed without any error caused by an empty storage 120 bin or a jammed mechanism. When the user presses the power button to start the program, the dispenser drops one food reward unit to test the reward bay 124. If reward bay 124 is jammed, the signaling module 116 emits a tone of 600 Hz for one second and the power indicator LED blinks for 0.5 seconds on and 0.5 seconds off until the user presses the power button again. For an exemplary second level training program, the dispenser 102 configures the system according to the system configuration settings (e.g., training program, session duration, session periodicity, etc.). The owner sets the session length switch to 10, 15, 20, or 30 minutes. Dispenser 102 ignores the setting on the "Interval Between Targeting" switch. When the user presses the power button in the dispenser, the program starts after 20 seconds.

In one embodiment, system 100 assumes a 10-hour day. In an alternate embodiment, system 100 assumes an 8-hour day. For ease of illustration, the following discussion refers to an assumed 10-hour day. One skilled in the art will understand that the relevant parameters, such as, for example, the session duration and number of hours between sessions, can be adjusted to accommodate an 8-hour assumed day.

With the sessions per day switch set to 1, the only session will start 20 seconds after the user presses the power button. The session lasts as long as the setting selected on the session length switch.

With the sessions per day switch set to 2, the first session will start 20 seconds after the user presses the power button. The second (and last) session will start 6 hours after the first session starts. Both sessions last as long as the setting selected on the session length switch.

With the sessions per day switch set to 3, the first session will start 20 seconds after the user presses the power button. The next session starts 4 hours after the first session starts. The last session starts 8 hours after the user presses the power button. All three sessions last as long as the setting selected on the session length switch.

With the sessions per day switch set to 4, the first session will start 20 seconds after the user presses the power button. The next session starts 3 hours after the first session starts. The following session starts 6 hours after the user presses the power button. The last session starts 9 hours after the user presses the power button. All four sessions last as long as the setting selected on the session length switch.

During each session, the trigger signal LED on the target is steady on. The trigger signal LED is off during the time period between sessions. During each session, signaling module 134 emits a repeating array of tones from the speaker as follows, for example:

| Frequency | Note | Note Name | Duration |
|---|---|---|---|
| 262 Hz | C4 | do | .300 sec |
| 294 Hz | D4 | ray | .300 sec |
| 330 Hz | E4 | mi | .300 sec |
| 349 Hz | F4 | fa | .300 sec |
| 392 Hz | G4 | so | .300 sec |
| 440 Hz | A4 | la | .300 sec |
| 494 Hz | B4 | ti | .300 sec |
| 523 Hz | C5 | do | .300 sec |
| 494 Hz | B4 | ti | .300 sec |
| 440 Hz | A4 | la | .300 sec |
| 392 Hz | G4 | so | .300 sec |
| 349 Hz | F4 | fa | .300 sec |
| 330 Hz | E4 | mi | .300 sec |
| 294 Hz | D4 | ray | .300 sec |

Generally, the total length of this array is between around 4.2 to 4.5 seconds. The target repeats this array continuously during the active session, with a variable gap between repetitions. During the active session, the target and dispenser operate as described above.

For an exemplary third level training program, the dispenser 102 configures the system according to the system configuration settings (e.g., training program, session duration, session periodicity, etc.). In particular, the owner selects 5, 10, 15, or 25 seconds on the Interval Between Targeting switch. Generally, system 100 operates as described above with respect to the exemplary second level training program, with the following additions:

If the dog owner sets the Interval Between Targeting switch to 5 seconds, the time from the end of one tonal array to the start of the next tonal array will average 5 seconds, with a range between 4 to 7 seconds. Each tonal array plays for 3 seconds. The dog must activate the target sensor while the tune is playing for the target to transmit the dispense signal (and in order for the dispenser to drop a food reward). System 100 repeats this sequence for the duration of the session as selected on the session length switch.

If the dog owner sets the Interval Between Targeting switch to 10 seconds, the time from the end of one tonal array to the start of the next tonal array will average 10 seconds, with a range between 8 to 12 seconds. Each tonal array plays for 5 seconds. The dog must activate the target sensor while the song is playing for the target to transmit the dispense signal (and in order for the dispenser to drop a food reward). System 100 repeats this sequence for the duration of the session as selected on the session length switch.

If the dog owner sets the Interval Between Targeting switch to 10 seconds, the time from the end of one tonal array to the start of the next tonal array will average 10 seconds, with a range between 8 to 12 seconds. Each tonal array plays for 5 seconds. The dog must activate the target sensor while the song is playing for the target to transmit the dispense signal (and in order for the dispenser to drop a food reward). System 100 repeats this sequence for the duration of the session as selected on the session length switch.

If the dog owner sets the Interval Between Targeting switch to 15 seconds, the time from the end of one tonal array to the start of the next tonal array will average 15 seconds, with a range between 12 to 17 seconds. Each tonal array plays for 7 seconds. The dog must activate the target sensor while the song is playing for the target to transmit the dispense signal (and in order for the dispenser to drop a food reward). System 100 repeats this sequence for the duration of the session as selected on the session length switch. It should be noted that these values are examples of numbers that may be used but the invention is not limited to these numbers.

If the dog owner sets the Interval Between Targeting switch to 20 seconds, the time from the end of one tonal array to the start of the next tonal array will average 20 seconds, with a range between 17 to 22 seconds. Each tonal array plays for 7 seconds. The dog must activate the target sensor while the song is playing for the target to transmit the dispense signal (and in order for the dispenser to drop a food reward). System 100 repeats this sequence for the duration of the session as selected on the session length switch. Generally, the settings, including the number of sessions determine the song length, the length of the wait between songs, and other configuration lengths.

For all four options, if the dog presses the target during a session while the tonal array is not playing, the countdown to the next song resets.

Therefore, system 100 can be configured to train a dog in a variety of approaches, without extensive pre-training. That is, generally, the embodiments disclosed herein are configured to require only minimal pre-training of an animal before unsupervised use. In some cases, however, it may be desirable to introduce a particular embodiment to an animal. As such, in accordance with one embodiment of the present invention, the following exemplary pre-training protocols are suitable for use in conjunction with the embodiments disclosed herein.

In training dogs for the first level, for example, the owner configures the system as described above for the first level program, but the owner activates the target sensor herself (holding the target in her hands or via the remote control) to trigger the dispensation. For example, the owner first sets the level to 1, then manually adds food rewards to the dispenser reward bay so that the dog learns that the reward bay contains food rewards. Then with the volume on low, the owner activates the target sensor (manually or via remote control), repeating the process until the dog automatically retrieves the food rewards from the reward bay when it hears the reward signal.

Next, so that dog does not learn to bark at, paw, or stare at the dispenser, and to ensure the animal understands that the reward tone or light indicates that a food reward will be dispensed, the owner starts activating the target sensor only when the dog looks at the owner's face. To encourage the dog to look at the owner's face, the owner can give some food rewards from the direction of her face. Then, when the dog looks at her, the owner can activate the target (manually or via remote control) sensor to dispense food rewards.

Next, the owner trains the dog to press the target (activating the target sensor) in order to release food rewards himself. The dog can activate the target sensor with a paw or nose. To train the dog to press with his nose, the owner places the target on the floor or wall at the dog's nose level, very close to the dispenser, with a small dab of peanut butter or wet dog food (just enough for one lick). When the dog licks or grabs the food it activates the target's pressure sensor and food reward is dispensed. The animal retrieves a food reward from the dispenser.

Next, the owner trains the dog to press the target (activating the target sensor) in order to release food rewards himself. The dog can activate the target sensor with a paw or nose. To train the dog to press with his nose, the owner places the target on the floor or wall at the dog's nose level, very close to the dispenser, with a small dab of peanut butter or wet dog food (just enough for one lick). When the dog licks or sniffs the target, or grabs the food, it activates the target's pressure sensor and food reward is dispensed. The animal activates the target sensor, and the dog retrieves a food reward from the dispenser.

Once the animal reliably licks or takes the food from the target (e.g., 10-20 times in a row), and then retrieves the dispensed food reward from the dispenser, the owner can remove the food lure from the target bays. The owner should then encourage the pet to investigate the target. When the animal touches the target, triggering the sensor, a food reward will dispense from the dispenser. In the event the dog will not touch the target on the floor, the owner can hold it closer to the dog's nose level at first. When the dog can activate the target sensor 10 times in a row without hesitation after getting a treat, the owner can move the target approximately 6 inches from the dispenser. As the dog's performance improves, the owner can move the target farther and farther away, increasing the exercise the dog must perform to retrieve the food reward.

In training dogs for the second level, for example, the owner trains the dog as described above for the first level. Next, the owner sets the system machine to the second training level. The owner can place the target on the wall or floor (or on chair at the dog's nose level). The pet should immediately want to go over to the target in order to earn food rewards. When the trigger signal (the tone and/or light on the target) activates, the owner releases the dog so that the dog can touch the target. The owner may need to encourage the dog to do so. When the dog touches the target a food reward is dispensed. The owner should be sure that the trigger signal is activated during this portion of the training.

To end the session, or when the trigger signal ends, indicating the end of a session, the owner removes the target from the dog's view so that the dog does not keep trying to activate the target sensor. Alternatively, the owner can teach the dog specifically that when light is off targeting does not work by letting the dog try to activate the target sensor when the trigger signal is not activated. Eventually, the dog will cease trying to activate the target sensor, although it will typically take many repetitions for the dog to understand that the dispenser only dispenses food rewards when the trigger signal is activated.

Another method for level 2 is to skip level 1 but start level 2 in the same manner as level 1 by putting a treat on the target. When the animal has learned to immediately go for the treat several times in a row, the process is repeated with the following variation. While holding the dog's collar, put the treat in the treat well, and then prompt the tune to start playing. Thereafter, release the dog's collar so he can go immediately to get his treats. Allow the tune to play throughout this training session and then turn the tune off at the end of the session and remove the target and base or let the dog extinguish his behavior by depressing the target when no tunes is playing.

In training dogs for the third level, for example, the owner trains the dog as described above for level 1, but quickly moves to level 3 as soon as the dog immediately activates the target and then runs to the base unit to get the food rewards. Next, the owners sets the machine to level 3 and the "Time to Press Target" switch to 5 sec so that the dog only has 5 sec to touch the target when the target plays a tune. The owner restrains the dog, showing the treat/target, which is just out of reach. When the trigger signal (the tone and/or light on the target) activates, the owner immediately encourages the dog to touch the target, releasing the dog so that the dog can reach the target.

Once the dog has successfully activated the target sensor (and retrieved the food reward the dispenser), the owner again restrains the dog until the next trigger signal. Alternatively, the owner can hold the target away from the dog, only situating the target within the dog's reach when the trigger signal activates. Generally, dogs learn fastest if they suddenly see and hear a cue. As such, once the dog perks its ears and surges to the target every time it hears the trigger signal, the owner can let the dog loose to try to activate the target sensor at will.

Once the dog is loose, it may attempt to activate the target sensor when the trigger signal is not activated. If the dog does attempt to activate the target sensor when the trigger signal is not activated, no food rewards will come from the dispenser, and the dog will have to wait longer for the next trigger signal. Eventually, the dog will learn to only attempt to activate the target sensor when the trigger signal is activated. The remote may be used to trigger the target.

In addition to the training session examples described above, the disclosed embodiments support other training techniques. For example, referring again to FIG. 5, faceplate 500 includes an active target selection module 540. Generally, active target selection module 540 provides an interface through which the user can select which targets are active. In the illustrated embodiment, module 540 includes a switch 542 and an indicator 544.

In one embodiment, switch 542 can be set to select each of a plurality of targets, individually. As such, in one embodiment, switch 542 can select between no targets, target 1, 2, 3, etc. In an alternate embodiment, switch 542 can be configured to select from among a plurality of configurations. For example, in one embodiment, selection 1 corresponds to "configuration 1" (e.g., targets 1 and 2), selection "2" corresponds to "configuration 2" (e.g., targets 1 and 3, zones 1 and 3, etc.). In one embodiment, one of the selections corresponds to all targets in the system. In one embodiment, one of the selections corresponds to a remote control input, in which the user selects the active target through a remote control.

In one embodiment, interface 500 includes a song selection module 545. Generally, module 545 can be configured to allow the user to select from among a plurality of pre-programmed songs. In one embodiment, interface 500 can be configured to receive and store custom audio in storage corresponding to one or more of the song selection options. In one embodiment, interface 500 can be configured to receive custom audio in storage corresponding to one or more of the song selection options.

So configured, a user can use system 100 to incorporate sounds, songs, and voices into training sessions. As such, system 100 can be especially useful in training services dogs (such as hearing dogs for deaf) to target to specific sounds, such as alarms or doorbells, and to return to the owner to receive a reward. In the illustrated embodiment, faceplate 500 includes a multi-target selection switch 550. In the illustrated embodiment, switch 550 is configured to select between multiple configuration options, including, for example, 0 (or single target only), 1, 1-2, 1-3, or 1-4. As described above, in one embodiment, switch 550 selects between specified targets as listed on switch 550. In one embodiment, the configuration options can be configured to identify pre-determined configuration patterns.

In the illustrated embodiment, faceplate 550 includes treat button 555. In the illustrated embodiment, treat button 555 is configured to send a dispense signal to the base station. In one embodiment, treat button 555 is configured to activate a reward signal and dispense a reward. One skilled in the art will understand that this feature can be used to train the dog to associate the reward signal with an available treat.

In the illustrated embodiment, faceplate 550 includes tune game selector 560. In one embodiment, tone game selector 560 is configured to select between two configurations, "on" and "off." In one embodiment, when the "tone game" is ON, whenever the target detects that the animal has pawed the target while the trigger signal is NOT active, the target delays activation of the next trigger signal.

As described above, the embodiments disclosed herein can be configured to support a wide variety of training programs. In addition to the training programs described above, the embodiments disclosed herein can also be configured as follows. For example, the disclosed embodiments can be configured in a series of tiered operational levels.

For example, in a first operational level, the targets emit no sound or light. The system is configured so that when the animal touches the selected target, the base station plays the reward signal and dispenses a treat. One skilled in the art will appreciate that the remote control can be used to cause the reward signal and dispensation when the animal approaches the target. Such manual control accelerates the animal's connection of the desired behavior with the reward, training the animal to touch the target (though "shaping" techniques).

In an exemplary second operational level, the selected target emits a trigger signal comprising a cue tune. In one embodiment, if the animal touches the target while the cue tune is playing, the base unit plays the reward signal and dispenses a treat. In one embodiment, if the animal touches a target that is not playing the cue tune, the target does not send a dispense signal (and the animal does not receive a reward). Further, in one embodiment, when the animal touches a target that is not playing the cue tune, the system delays the next activation of that target (e.g., by 15-30 seconds).

In one embodiment, a remote control can override the targets' and the base unit's default behaviors. For example, in one embodiment, if the animal is standing stationary and not stepping on the target, and the user does not want to wait 15-30 seconds for the cue tune to play again, the user can activate the target manually. In one embodiment, the remote control includes a tune button that sends an activation signal to the selected target, causing that target to play its cue tune.

One aspect of the embodiments of the present invention is that the system has selectable tones so that different and multiple systems may be deployed within a house to further increase the training and amount of exercise a dog or animal gets. Furthermore, the tone/music duration is adjustable to be of short, medium, long and very long duration. Generally, the farther the dispenser is from the base unit the longer the tone should be to allow the animal enough time to get there before the tune plays again. Finally, the interval should not be too long so that the animal can clearly discern when the game/activity is over. Otherwise, the animal may stay by the system all day waiting for the next treat.

The following Table 1 illustrates specific training methodology based on what is within a user manual that may be considered when using the various embodiments of the inventive training system. It should be noted that some items in Table 1 are different than described elsewhere reflecting an alternative embodiment.

TABLE 1

| Product Items | I. Features |
| --- | --- |
| Remote Control | Button 1: Causes the base unit to emit a tone and then release a treat (within 0.3-0.5 sec of pressing the button).<br>Button 2: Causes the target to play a tune/light turns on that cue the dog that if he steps on or noses the target, a tone followed by a food treat will be released from the base unit. |
| Base Unit | Must dispense reliably and immediately<br>The tone and light on top:<br>activates when remote control "button 1" is pressed and immediately releases a treat.<br>also plays repeatedly (on and off) for 30 seconds when there's a food jam or when the base unit is out of treats<br>Tone: Different volumes including a "0" volume (0, soft, medium, loud). Provides different options on the tone since owners may opt to have more than one target tag in the house.<br>The base unit/remote control/target can have one of 250 (many) different frequencies for communications between systems devices so that there will be no interference. |
| Target | Extremely sensitive to touch to detect desired action.<br>Target sends a signal the base unit to release a treat.<br>Switch 1: An on-off switch/level 0, 1, 2, 3. Tone emitted at power so that the operator knows that the target is on.<br>Switch 2: controls volume of the tune (levels 1, 2, 3)<br>Switch 3: controls duration of tune/light: short, med, long, super-long. Note: the farther the target is from the machine the longer the tone must be. For instance if the dog must run 30 feet from the base unit to the target the dog needs enough time to get there at a fast trot or run. Then the dog should have enough time to get back to the base unit for his reward before the tune plays again. So the interval between tune activation should be long enough too.<br>Switch 4: controls interval between play (short, medium, long, super-long - or 5 or 6 different intervals) Note that we wouldn't want the interval between playing too long (e.g. not over 45 s–1 min) because we want the dog to know when the games are over too vs. waiting for an hour thinking the tune may play again - unless we are using the target game to train focused quiet behavior for longer periods.<br>Switch 5: has a timer function so that sets the target activate during 1-4 sessions during the day when you are gone<br>Indicator light: Needs a battery low indicator light. This light is for the human to recognize. So, if the light is the lens light on the top of the target, you CAN use one color for when a tune is playing and another color for when the battery is low. |
| | Target Tag has Various Skill Levels |
| Level 1<br>Basic | Target: No tune or light<br>Dog touches the target and the target triggers a treat to come out of the base unit.<br>Note that during the training phase you will probably want to use the remote control to cause the base unit to emit a tone and release treats when the dog gets close to touching the target. (e.g. to help you train the dog via shaping to touch the target). In fact you may first train him that the base unit emits a tone and releases treats right after the tone. |
| Level 2<br>Impulse control<br>(target on cue only) | Target: Emits a cue tune<br>When the target emits a cue tune, then, if the dog touches the target while the tune is playing, the base unit dispenses a treat. If the dog touches the target when a tune is not playing then treats are NOT dispensed from the base unit and the dog must then wait for 10-30 seconds before the target will play a tune again.<br>Note: the remote control can override what the target and the base unit automatically do. So if the dog is standing stationary and not stepping on the target and you don't want to wait 10-30 seconds for the tune to play again you can hit the tune button on the target to cause the target to play a tune such that if the dog steps on the target, a treat will be released from the base unit.<br>The target tune length is fixed (short, medium or long, etc.) and the interval between tunes cues is fixed (short, medium, or long, etc.) (SY: may have more than 5 lengths and intervals-maybe it will be digital.<br>At this level you can also set the machine's timer function such that the target becomes activated during short sessions during the day. |
| Level 3<br>Super fit | Target: Same as level 2 but the interval between the tune is variable. So the dog never knows exactly how long he will have to wait. That makes the game more exciting. |

TABLE 1-continued

| Product Items | I. Features |
|---|---|

Training Stages
Best if the dog earns his meals this way.

| | |
|---|---|
| Stage 1<br>Train the dog that the base unit emits a tone and releases treats.<br>So tone = treat release. | See the Treat & Train Protocol for training dogs to respond to the base unit. The protocol here can be more relaxed though since the entire process is simpler for this device.<br>Step 1: First just place treats/kibble in the dispenser to make sure the dog's not afraid of the machine and to make sure he's really motivated for the food.<br>Step 2: Beep the remote control, which causes a treat to dispense. If you think dog will be fearful of the machine. First toss treat away from the machine so he'll move far away and then dispense the treats from the base unit. The dog will be at other side of room and hear the sound and orient but not be as scared since he's far from the machine. If he can easily/immediately take treats (no fear) when they are dispensed when standing near the machine, go to step 3. Note that if he doesn't orient well to the base unit or is hesitant to get the treats, you may need to point to the base unit for him to know what to do. If he doesn't orient to the sound and is likely to walk away, then time the beep/treat release to occur when he's looking at the machine at first.<br>Step 3: Turn the tone volume on low and repeat step 3.<br>Step 4: Repeat this but with him looking away from the machine (at your face).<br>TROUBLE SHOOTING: Avoid rewarding him when he's pawing the machine. See Treat & train instruction manual and video to see what to do. |
| Stage 2<br>(Game level 1) | Now the tone from the base unit can be used to mark a correct behavior that you want to train. For instance we can now train the dog that touching the target with his nose or paw causes the base unit to dispense treats.<br>Step 1: Place a tiny treat on the target. (Note turn the target on). When he goes over to take the treat off, he should depress the target cause the base unit to emit a tone and dispense a treat. Repeat this until he keeps going back without hesitation to get a treat off the target. Then try it without a treat lure on the target.<br>a) If he sniffs the target be ready to use the remote control to release a treat in case he doesn't depress the unit hard enough.<br>b) Alternatively you can use smaller treats such as a smidgeon of cheese - so that he can barely see the treat but touches the target hard enough to make it dispense.<br>c) Repeat this until he automatically goes to touch the target with his nose (or foot) starting within 3 seconds of getting his last treat.<br>d) If he won't sniff the target with the treat on it, you can instead shape the touch by first rewarding him when he looks at the target, then rewarding getting closer and looking, then reward actual touching.<br>II. Step 2: Try the same thing with the target farther from the base unit and in different locations relative to the base unit.<br>Play this game whenever you want to. If you want to go to level 2 where the dog learns to trigger the target ONLY on cue, then do not stick on level one for more than 30 trials once he's learned that touching the target allows food to dispense. |
| Stage 3:<br>(Game level 2)<br>Now the dog only gets rewarded if he touches the target when the target plays a tune.<br>(Level 2) | NOTE: once they learn this they should never go back to game 1. Set target to level 2: Now you can USE the remote control target button to cause the target to play a tune or set the machine to emit the tune on an automated schedule. Place the unit setting on the longest tune duration and a medium or longer interval (e.g. over 5 seconds) between tunes. This setting causes the target to emit the cue tune automatically at a fixed interval (short or medium or long or super-long).<br>Step 1: Start with the your dog at least several feet from the target. If he's gone through stage 2 of training then he should be ready to run over to trigger the target. You may need to hold the dog's collar at first so doesn't just run over to touch the target. Then when the tune plays release him and so he run over to nose or paw the target so he can get a food reward from the base unit.<br>Repeat this until he's done it 5-10 times.<br>Step 2: Repeat step 1 but this time don't hold his collar. Let him step on the target whenever he wants. If the tune is off and he steps on it, he won't get any treats and the tune won't play for 10-30 seconds (I can't remember the specs right now). You can depress the "tune" button to cause the target to play the cue tune sooner if you want. He'll go through many trials where he'll try to depress the target when it's not playing the tune but if he gets enough rewards for touching it when it's on (after he's waited for a while because he figures out it doesn't work when the tune is off), then he'll learn quickly.<br>Now owner can have this play randomly or on a timer. When the game starts the tune from the target will signal the start. Owner can set the game to play 1-4x a day (8 hour period or 10 hr). Note that if the target |

TABLE 1-continued

| Product Items | I. Features |
|---|---|
| | plays the cue on a short interval, the dog could finish his meal for the entire day within 10 minutes. So with more sessions, the interval between tunes should be longer. |
| Level 3 | Same as level 2 but now the target plays the tune with a variable interval delay. |
| Multiple targets | The target's cue may be a tune or it could be a different sound that was programmed. Each target(in the case of multiple target) may have a different cue. For instance the sound of a microwave or doorbell could be recorded/downloaded such that the product could be used to train assistance dogs to alert to these sounds. E.g. dog a) learns to run to the sound and then back to the owner to alert the owner. OR b) hears the sound and is taught first to alert the handler and then run to the target/sound source. |
| | Steps for a) i. When dog runs to and touches the target that has emitted the desired cue, then the dog runs back to the base unit, which is situated near the human and gets a rewards. ii. Next dog is on leash and when he dog steps on target and runs to get to base unit, the leash keeps him from getting to the base unit. When he gets to end of leash, call him and have him perform an alert behavior such as touching your hand with his nose or stepping on your feet and dispense a treat from the base unit. (Note use an alert behavior that you have trained him to do previously). Repeat until the dog's pattern is automatic. |
| | Steps for b) Have dog on leash. Let target make its cue tone (microwave, doorbell, etc). When dog hears it, don't let him go, have him perform alert behavior first (step on or target nose to human), then let him run to the target to step on it and get a rewards. NOTE a and b: early stages have the target close by. |
| | Can have multiple targets with multiple cue tunes or visual cues or even scent cues. (need a receptacle for scent. It must be removable and easy to clean via dishwasher Or disposable). Dog may be required to target to several different targets sequentially in order to get a reward. |
| | Can have multiple targets: each target is paired with a different response. One might require nose targeting, one foot targeting, one require the dog lie down, etc. The targets may be different shapes and sizes. |
| | Can have the target triggered by house alarm, doorbell and then used to train the dog to perform appropriate behavior that he enjoys rather than barking, jumping, or becoming anxious or fearful. (Desensitization/counter-conditioning). The target has the sound of the alarm, or doorbell (recorded) or other sound. Set the target to trigger in sessions during the day so the dog gets lots of practice running to the target and getting rewards and associating the alarm/doorbell with positive experiences. Then also set the machine so that when the doorbell/alarm are set of, that the target automatically is triggered so that the dog runs to step on it. Then have the tune/cue trigger frequently enough so that the dog is performing the targeting in rapid succession for 20-30 seconds (be able to set this). Also include a function where if the dog performed 5-10 repetitions in rapid succession, the interval between next target cue increases. The goal is that the can wait longer periods between targeting without becoming reactive to the actual alarm or people entering the house (ass associated with the doorbell). |
| | Note that this system can also be used with other types of sounds that might cause anxiety in dogs - fireworks, thunder, or loud sounds that would trigger a dog to bark. E.g. it could be triggered by non-specific sounds above a certain decibel level. In that case the sound from the target would not be the same as the non-specific target sound. The dog could even nose or foot target to the target and then after 3-10 target-treat patterns, a second target could be triggered in which the dogs' goal because is to lie down calmly for increasingly long periods in order to train calm behavior. So this could be used to treat thunderstorm phobia and fireworks phobia. |
| | The multiple targets (or even one individual target) could be used to train the dog to run to a specific location in an emergency event such as file alarm going off or to run to a different location (different room) if doorbell were ringing. For this, different targets should have different sounds. Also good if base units could have different tones. Both base unit and target would have to be in the location where you want the dog to go. To train this you'd just- |
| | Ensure that the dog had a lot of practice with the target and base unit in this location (with the target emitting the appropriate tune - fire alarm or doorbell, etc) so the dog was used to associating that specific sound with going to the special location to target. Once the dog gets to that location, the rate of targeting to the cue down and being rewarded with treats should be rapid at first and then slow down leading to increased intervals of calm/stationary behavior between performing the targeting exercise. |

Figure 6:
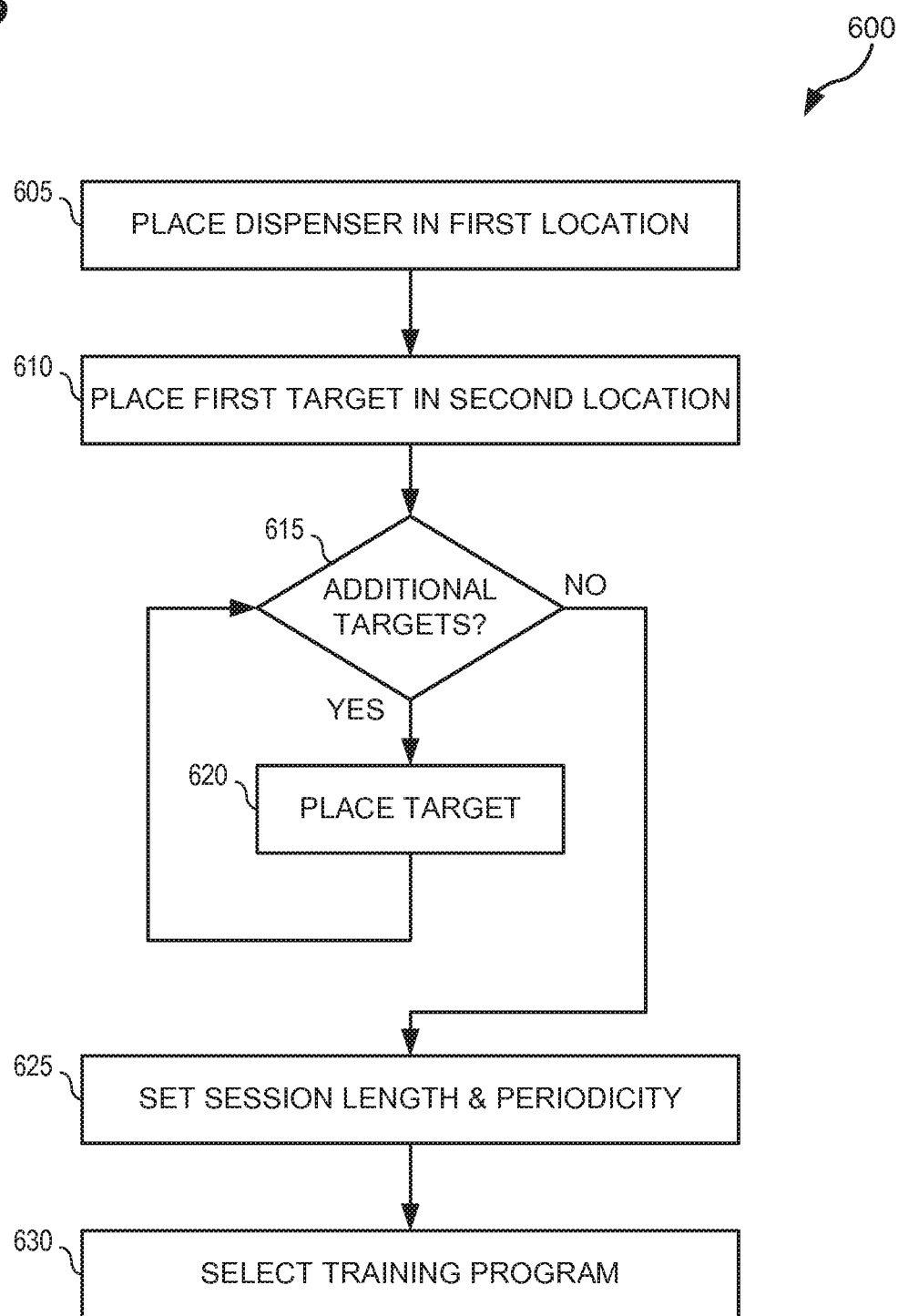
FIG. 6 illustrates a high-level flow diagram depicting logical operational steps of an improved animal training method, which can be implemented in accordance with one embodiment.

FIG. 6 is a flowchart that illustrates a method according to one embodiment of the invention. The method commences with placing a dispenser in a first location (605). Thereafter, the method includes placing a first target in a second location (610). The method then includes determining whether there are any additional targets (615). If yes, the method includes placing a second target in a third location (620). Thereafter, the process is repeated for any additional targets starting with step 615. At this time or eventually, when the method includes determining that there are no additional targets, the method commences with setting a session length and a periodic this city (625). Finally the method includes selecting a training program (630). Generally, the method of FIG. 6 is about placing the dispenser and the targets throughout a facility, home, or structure. The method also includes, in one embodiment, setting all of the various parameters according to the embodiment for the structure, as illustrated above in FIG. 5.

Figure 7:
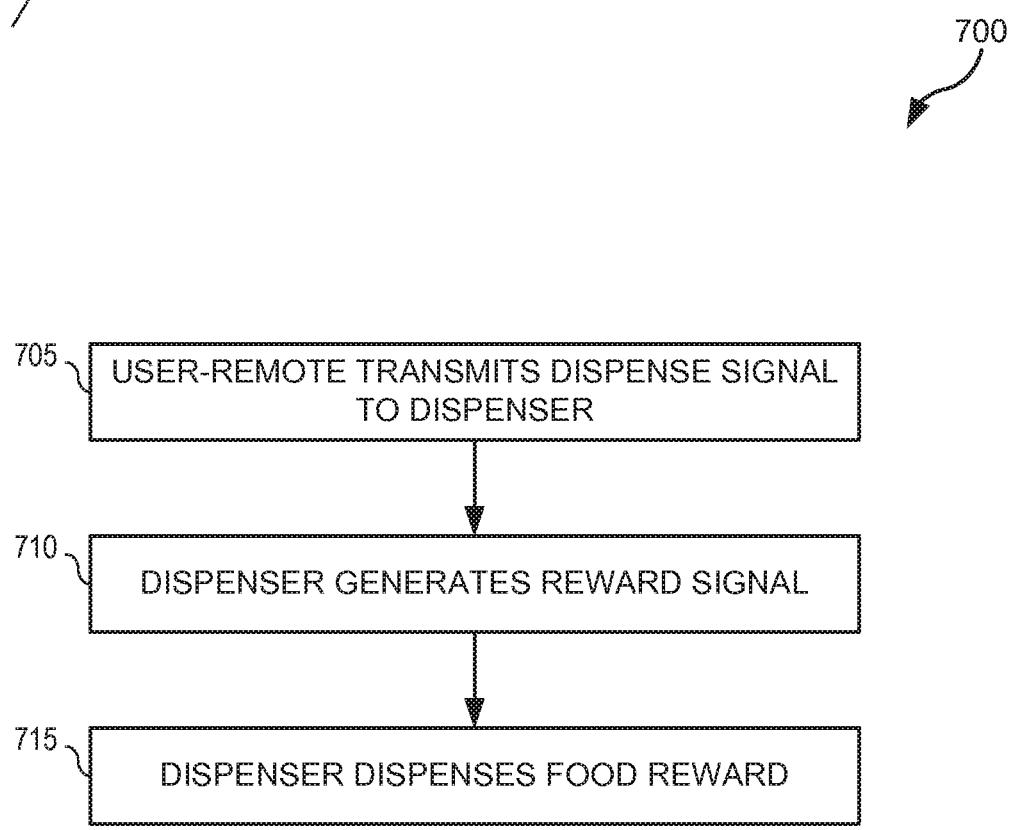
FIG. 7 illustrates a high-level flow diagram depicting logical operational steps of an improved animal training method, which can be implemented in accordance with one embodiment.

FIG. 7 is a flowchart that illustrates a method according to one embodiment that includes a user remote. The method commences with a user-remote transmitting a dispense signal to the dispenser (705). Thereafter, the method includes the dispenser generating a reward signal (710). Finally the dispenser dispenses the food reward (715).

Figure 8:
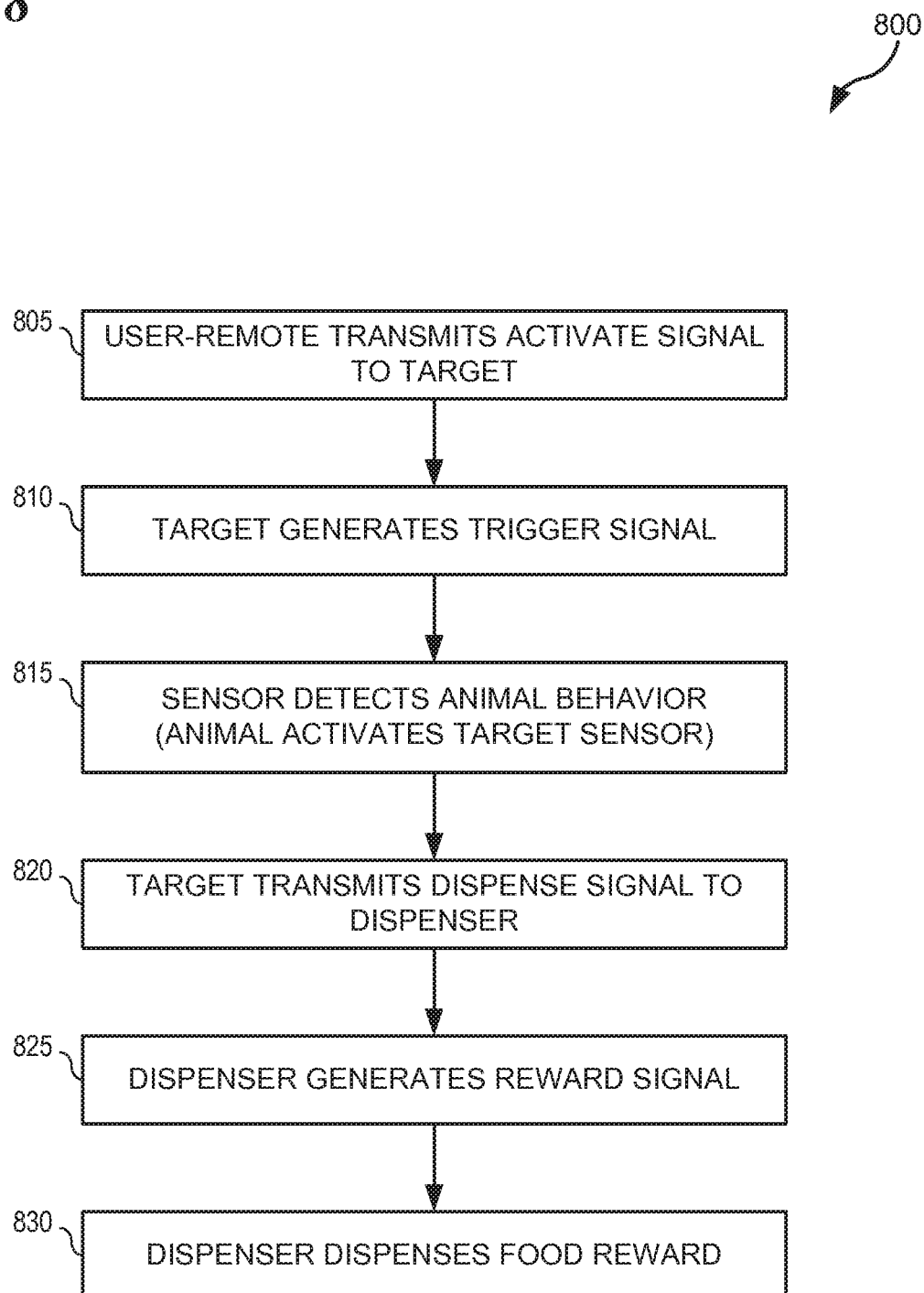
FIG. 8 illustrates a high-level flow diagram depicting logical operational steps of an improved animal training method, which can be implemented in accordance with one embodiment.

FIG. 8 is a flowchart that shows an alternative embodiment for a method of the present invention. The method commences with a user-remote transmitting and activate signal to a target (805). Thereafter, the method includes the target generating a trigger signal (810) and a sensor detecting a desired animal behavior (815). Here, the animal activates the target sensor. Thereafter, the target transmits a dispense signal to the dispenser (820). The dispenser generates a reward signal (825) and a dispenser dispenses a food reward (830).

Figure 9:
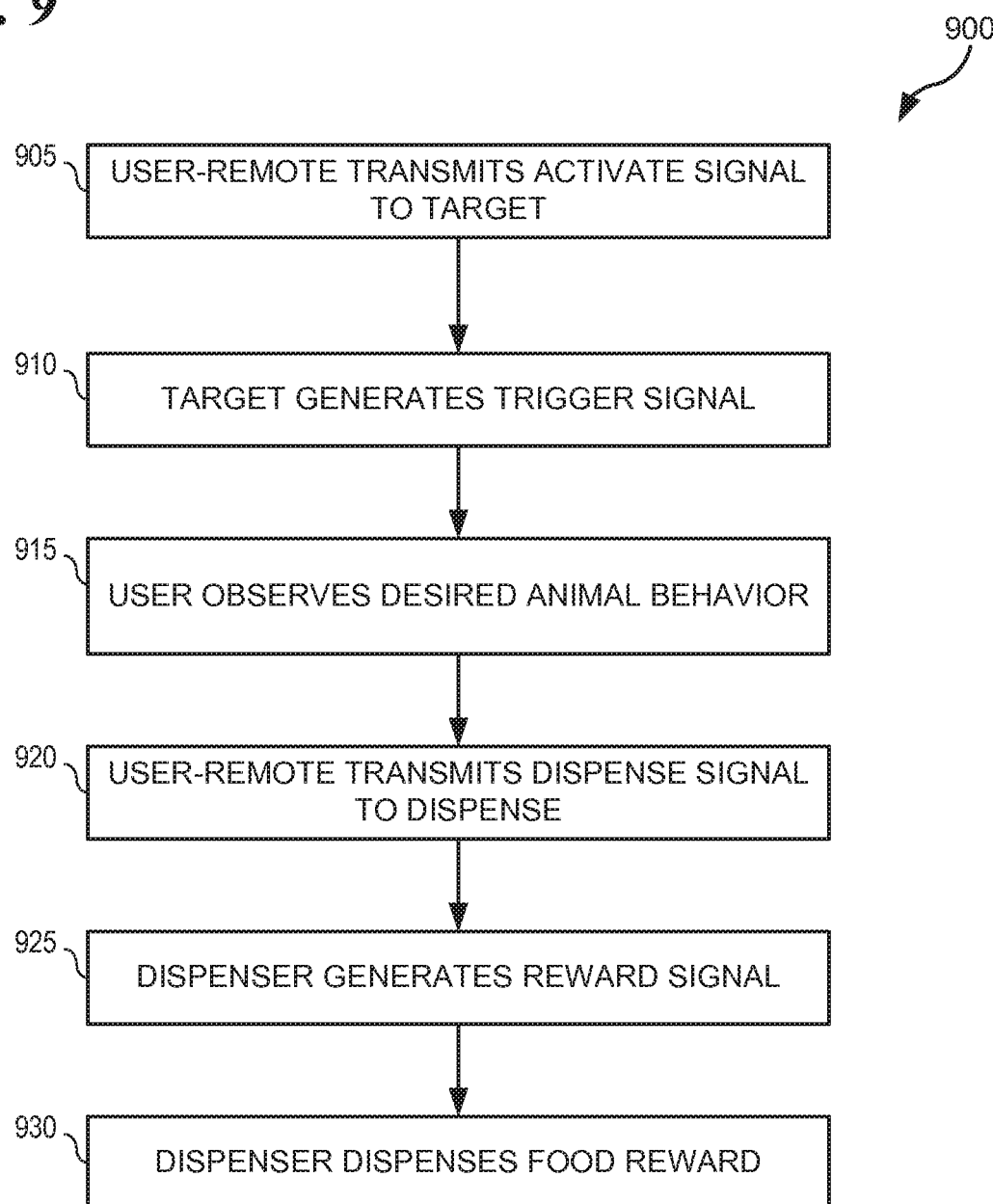
FIG. 9 illustrates a high-level flow diagram depicting logical operational steps of an improved animal training method, which can be implemented in accordance with one embodiment.

FIG. 9 is an alternative method for dispensing a food reward according to one embodiment of the invention. The method commences with a user-remote transmitting and activate signal to a target (905) and a target generating a trigger signal) 910). A user then watches the animal behavior, and observes the desired animal behavior (915). Upon activation, the user-remote transmits a dispense signal to prompt the dispensing of a food reward or other reward (920). Based on step 920, the dispenser generates a reward signal (925) and a dispenser dispenses the food or other reward (930).

Figure 10:
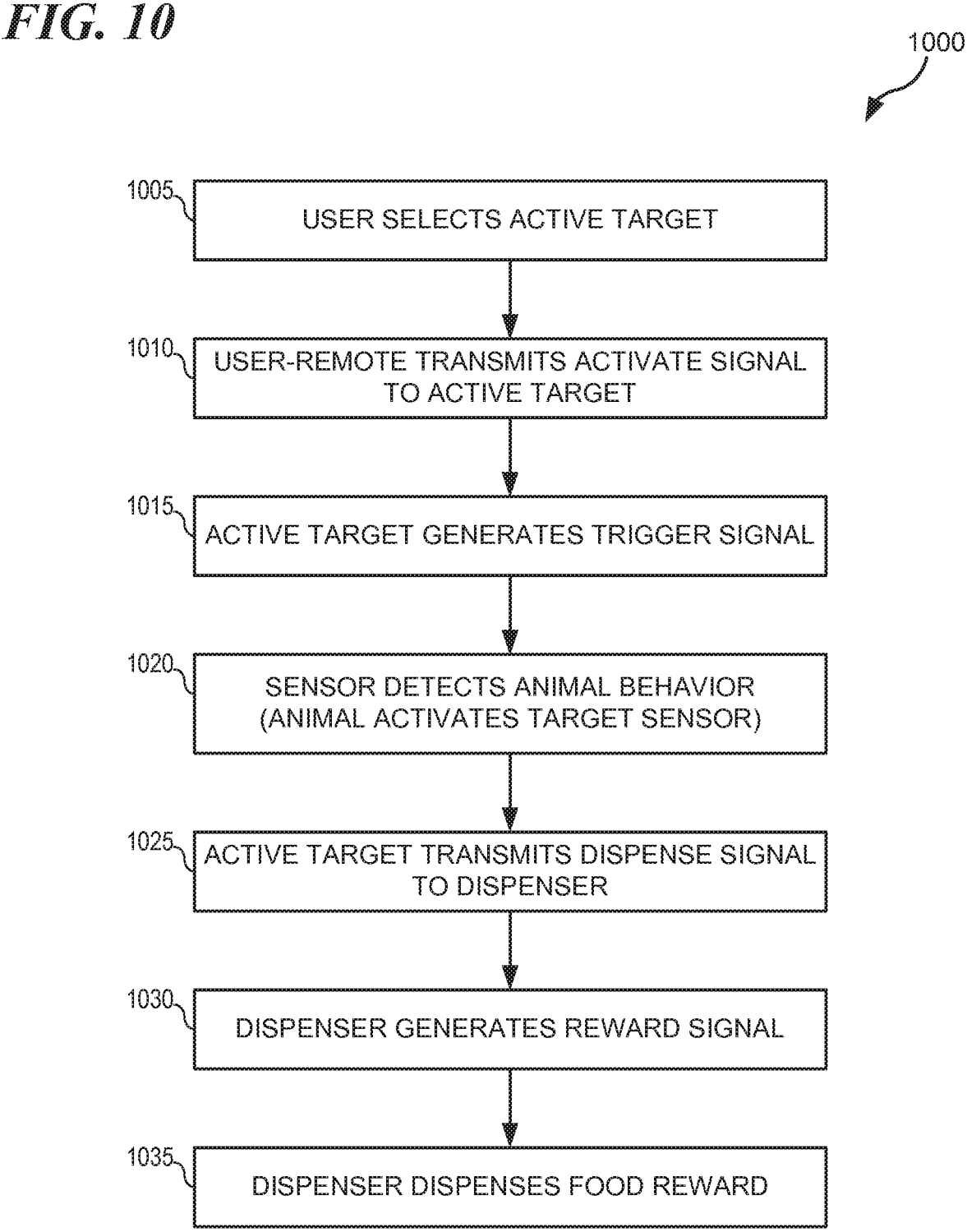
FIG. 10 illustrates a high-level flow diagram depicting logical operational steps of an improved animal training method, which can be implemented in accordance with one embodiment.

FIG. 10 is a flowchart that illustrates in alternative embodiment of the invention. The method commences with a user selecting an active target (1005). Based upon user action, a user-remote transmits and activate signal to the active target (1010). The active target then generates a trigger signal (1015). A sensor animal detects behavior when the animal activates the target sensor (1020). The active target transmits a dispense signal to the dispenser (1025). The dispenser generates a reward signal (1030) and the dispenser dispenses a food reward (1035).

Figure 11A:
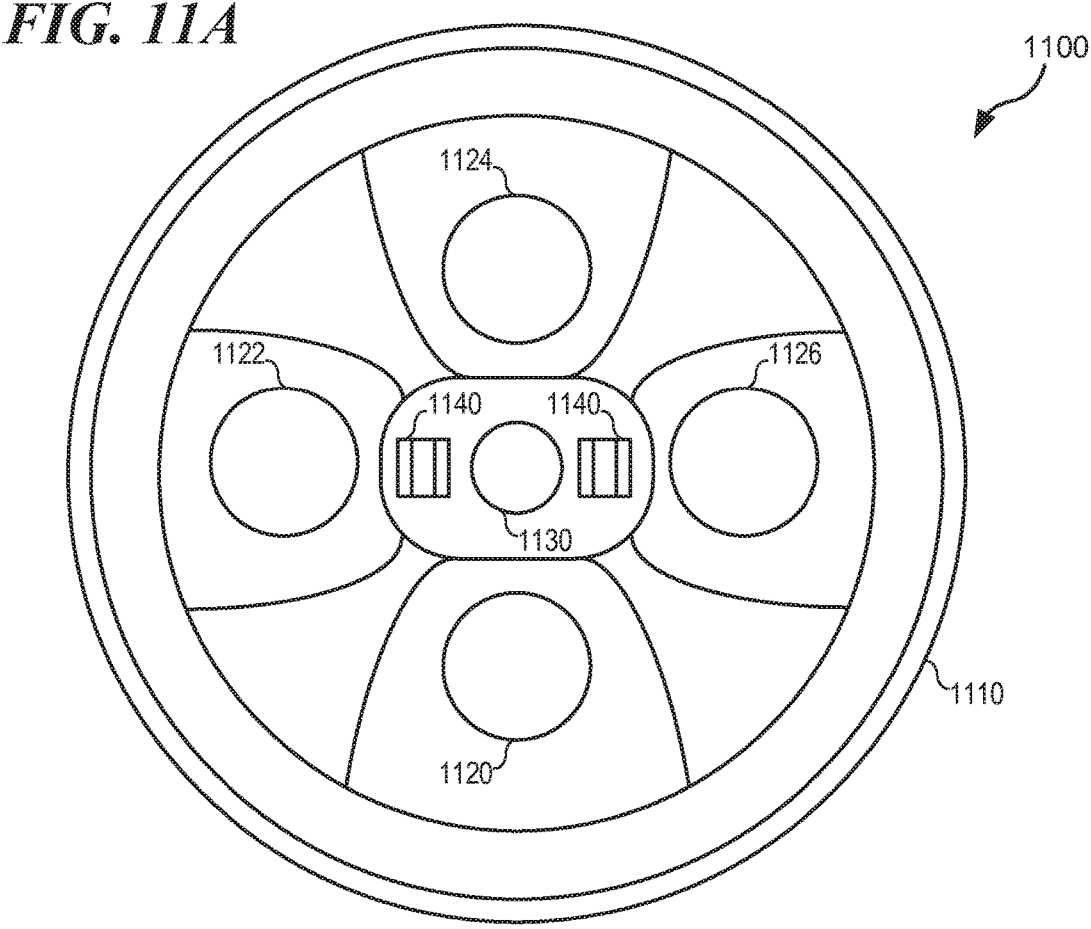
FIGS. 11A and 11B illustrate a top and side view of a target sensor device in accordance with one embodiment of the present invention.
Figure 11B:
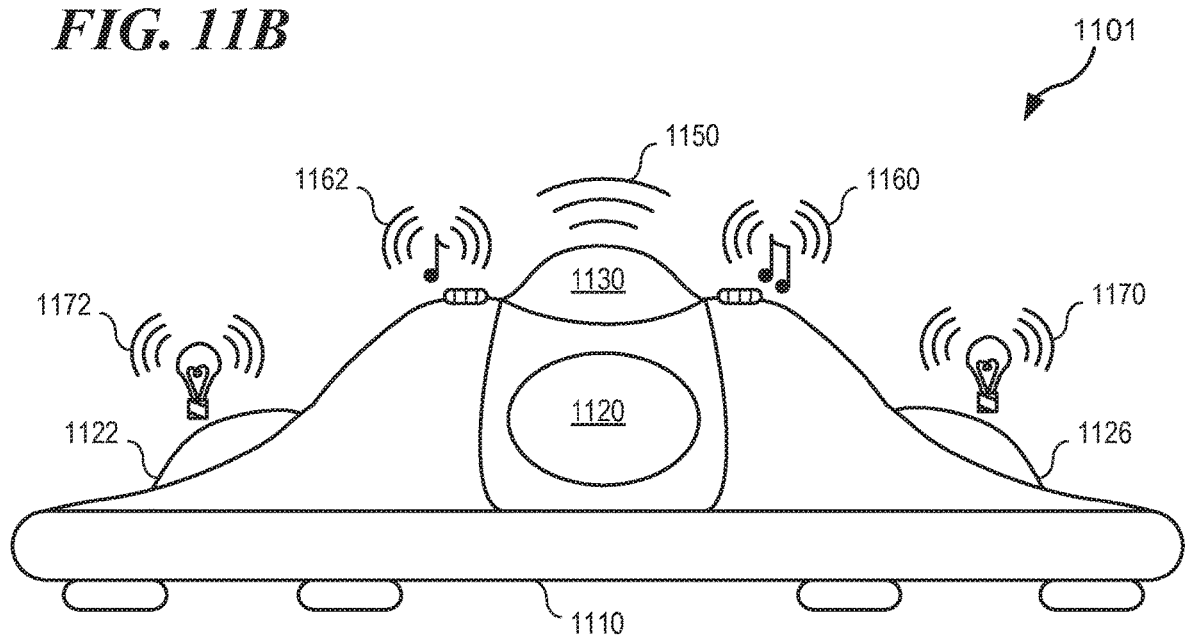

FIGS. 11A and 11B are top and side views, respectively, of a target dispenser according to one embodiment of the invention. Referring to FIG. 11A, a top view 1100 of a target may be seen wherein the target 1110 includes visual and aural means for providing feedback or prompts to an animal such as a dog according to one embodiment of the invention. In the described embodiment, target 1110 includes four lights 1120-1126, a wireless radio transceiver port 1130, and two sound ports 1140. The sound ports 1140 comprise speakers and circuitry that are programmed to play specified tones, sounds or tunes. It should be understood, that the circuitry that includes the logic for generating the tones, sounds or tunes may be within a central processor or control circuitry.

Referring now to FIG. 11 B, the four lights 1120-1126, wireless radio transceiver port 1130, and sound ports 1140 may be seen. The wireless radio transmissions are shown as 1150. As also shown, target 1110 radiates sound 1160, sound 162, light 1170, and light 1172.

Figure 12:
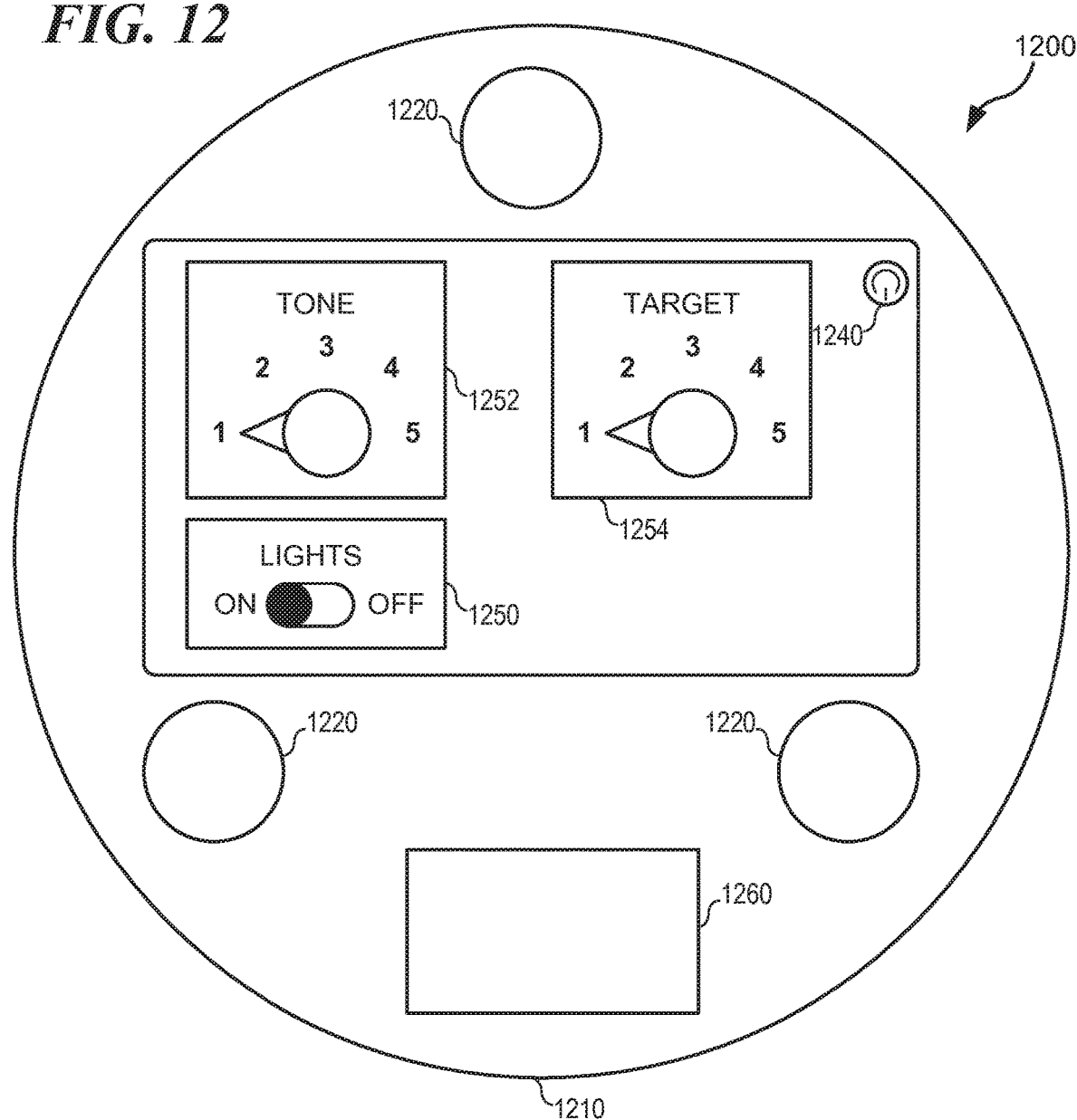
FIG. 12 illustrates an exemplary user interface in accordance with one embodiment.

FIG. 12 illustrates a bottom view of a target 1210 according to one embodiment of the invention. Target 1210 includes three feet 1220, a power switch 1240, a light power switch 1250, a tone selector 1252, a target identifier switch 1254, and a battery port 1260. As may be seen, in the described embodiment, one of five different tones may be selected. Also, one of five different target identifiers may be selected with target identifier switch 1254. Accordingly, a user may readily determine which target is controlled by various control elements of the animal training system.

Figure 13:
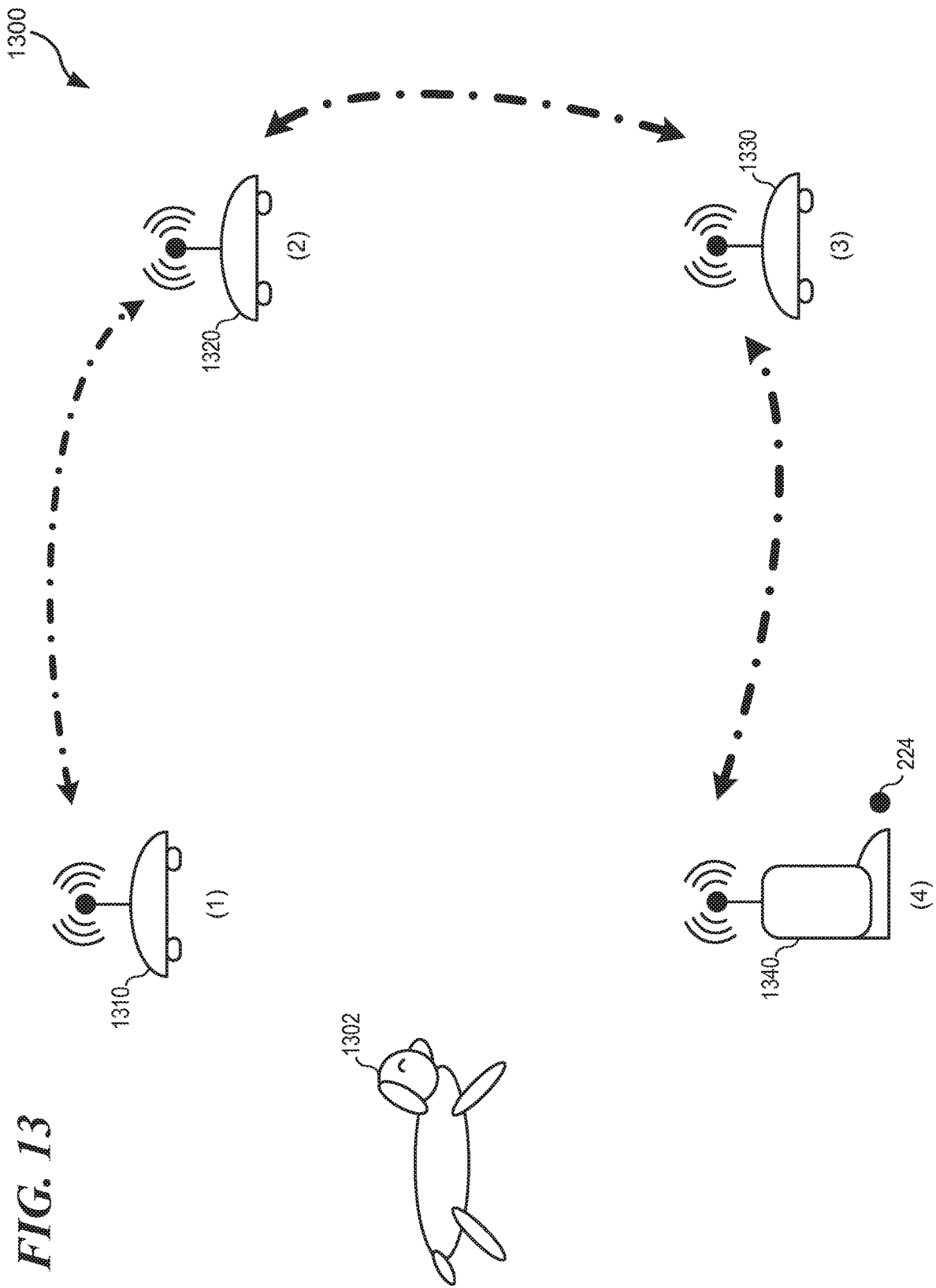
FIG. 13 illustrates a high-level block diagram showing an animal training system in accordance with one embodiment.

FIG. 13 illustrates one embodiment of the invention. As may be seen, a dog 1302 is present with a system that includes three targets, namely targets 1310, 1320 and 1330, as well as a dispenser 1340. Dispenser 1340 dispenses food rewards 224 for the dog or animal upon a demonstration of a desired behavior. Operation of the system in FIG. 13 is as described in the various flowcharts and other method steps described here in this specification.

Figure 14:
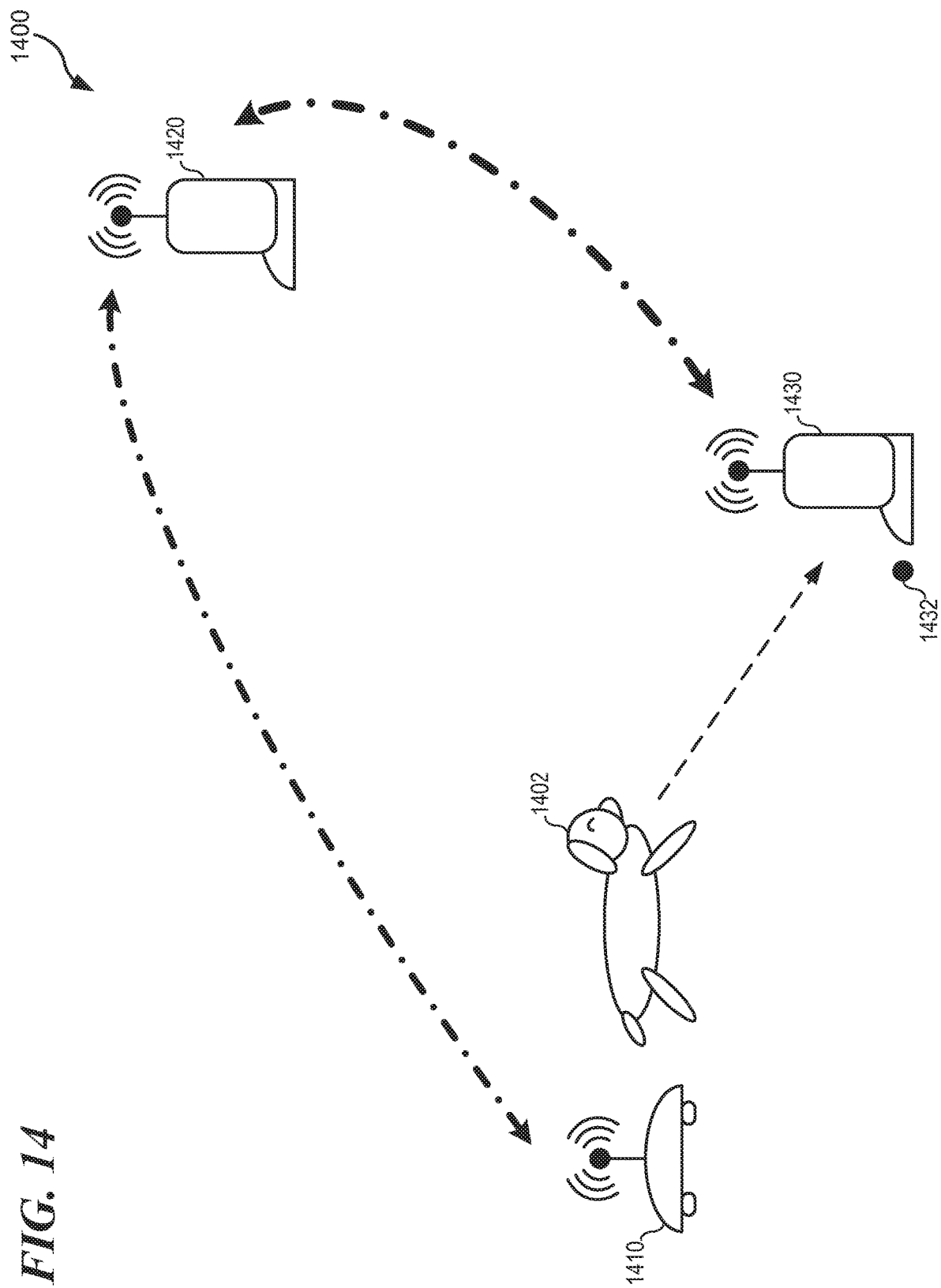
FIG. 14 illustrates a high-level block diagram showing an animal training system in accordance with one embodiment.

FIG. 14 illustrates one embodiment of the invention that includes one target and two dispenser. As may be seen, a dog 1402 is present with a system that includes one target 1410, and a plurality of dispensers, namely dispensers 1420 and 1430. Dispenser 1430, the described example, dispenses food rewards 1432 for the dog or animal upon a demonstration of a desired behavior. One aspect of the invention shown herein is that the target 1410 is configured to select which of the two dispensers 1420 and 1430 it interacts with for training animal 1402. Another aspect shown herein is that dispensers 1420 and 1430 are configured to communicate with each other to coordinate the training of animal 1402. In an alternative embodiment, target 1410 directs dispensers 1420 and 1430 to alternate generating a reward signal after the animal 1402 has successfully interacted with target 1410 so that the animal 1402 is running back and forth between target 1410 and the two dispensers in an alternating manner. While this embodiment only shows two dispensers, it should be understood that more dispensers may be utilized (e.g., up to five in one embodiment).

FIG. 15 is a functional system diagram that illustrates a dog training system that includes cameras. As may be seen, in the described embodiment, a system shown generally at 1500 includes a target 1510 that further includes an antenna for wirelessly communicating with a dispenser or handheld controller (not shown here) as well as a source for generating sound to prompt a desired response from an animal such as dog 1502. Additionally, as maybe seen, target 1510 includes a camera 1520 which is configured to record the actions of dog 1502 as well as to produce the digital images to radio transmission circuitry to wirelessly transmit the images or streaming video generated by camera 1520.

Continuing to examine FIG. 15, another camera 1530 is operationally disposed within a structure, home or building (or even outside) and is not necessarily disposed to be proximate with a target such as target 1510 or a dispenser. As maybe seen, camera 1530 is communicatively coupled to a network 1540 into a user interface 1550 that allows a user to view the images captured by camera 1530. Network 1540 may be a wireless network within the house for example, a Wi-Fi network, or it may be a data packet network such as the Internet. The combination of camera 1530, network 1540, and user interface 1550 allows a user to observe its animal or pet such as dog 1502 at any desired time but especially during training with target 1510 and other system components such as dispensers which are not shown here in FIG. 15.

Figure 16:
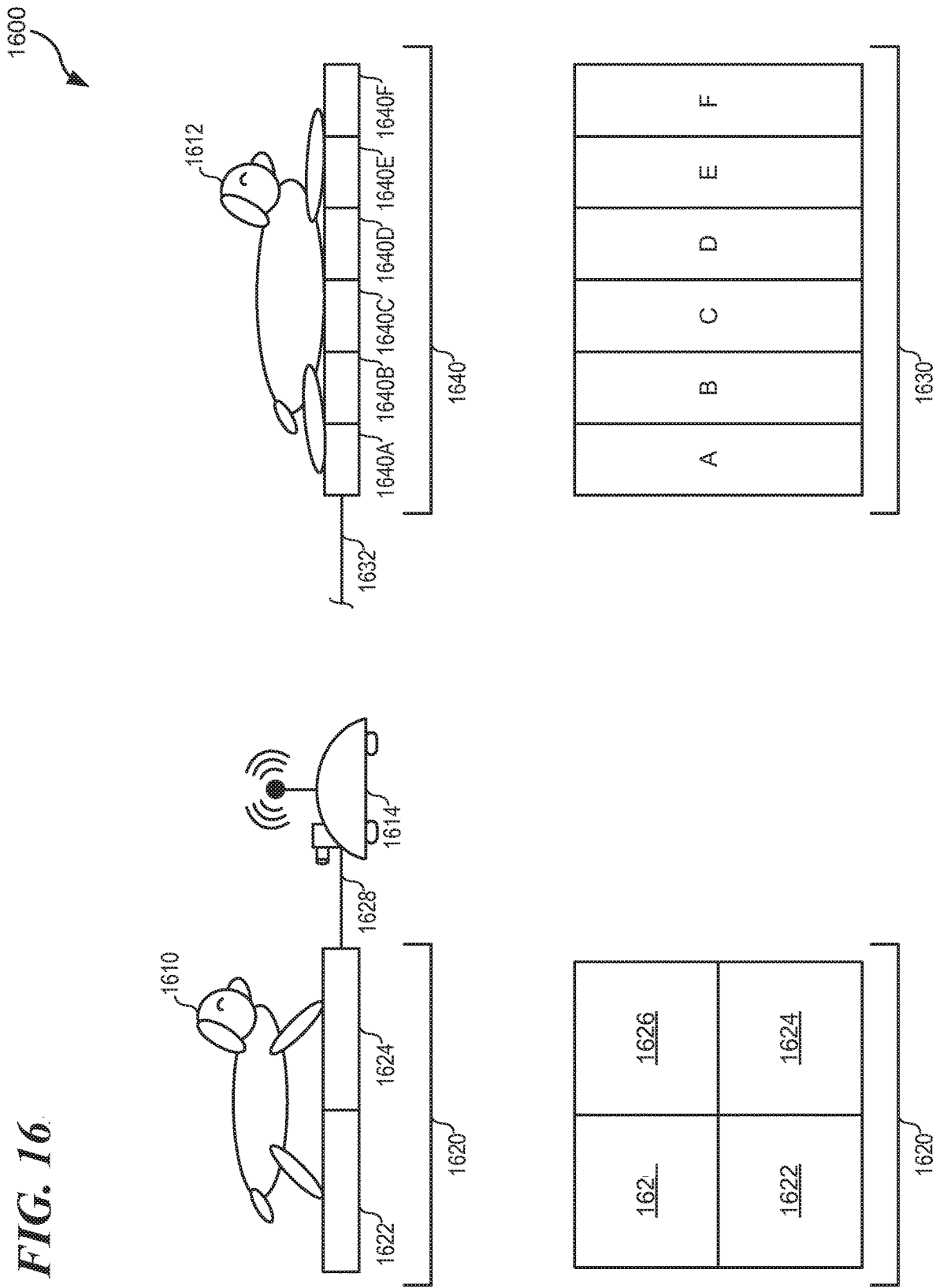
FIG. 16 illustrates a high-level block diagram showing an animal training system in accordance with one embodiment.

FIG. 16 is a functional diagram that illustrates other types of interactive devices that may be used in conjunction with a target training system according to one embodiment of the invention. As maybe seen, a dog 1610 is standing on a mat 1620 that includes sensors for detecting when dog 1610 is standing on the mat 1620. Mat 1620 includes four sections 1621, 1622, 1624, and 1626. Each of these four sections includes sensors and circuitry for detecting whether the dog 1610 is stepping on that section. Mat 1620 is connected to target 1614 via a wired connector 1628. It should be noted that target 1614 includes a camera similar to target 1510 of FIG. 15.

The actual configuration of a mat such as mat 1620 may be easily modified according to design and training goals. For example, a mat 1630 includes six sections A, B, C, D, E and F that may be used to determine where a dog such as dog 1610 is standing. Mat 1640 is configured similarly to Matt 1630 and includes six sections 1640A-F back in each the tact when a part of the weight of a dog is on top of the corresponding section. Here, one may see a dog 1612 is fully stretched out across all six sections. Mat 1640 is configured to communicate each of the detections of the dog generated by the six sections via a tether or wire 1632 that is coupled to a target such as target 1614.

Figure 17:
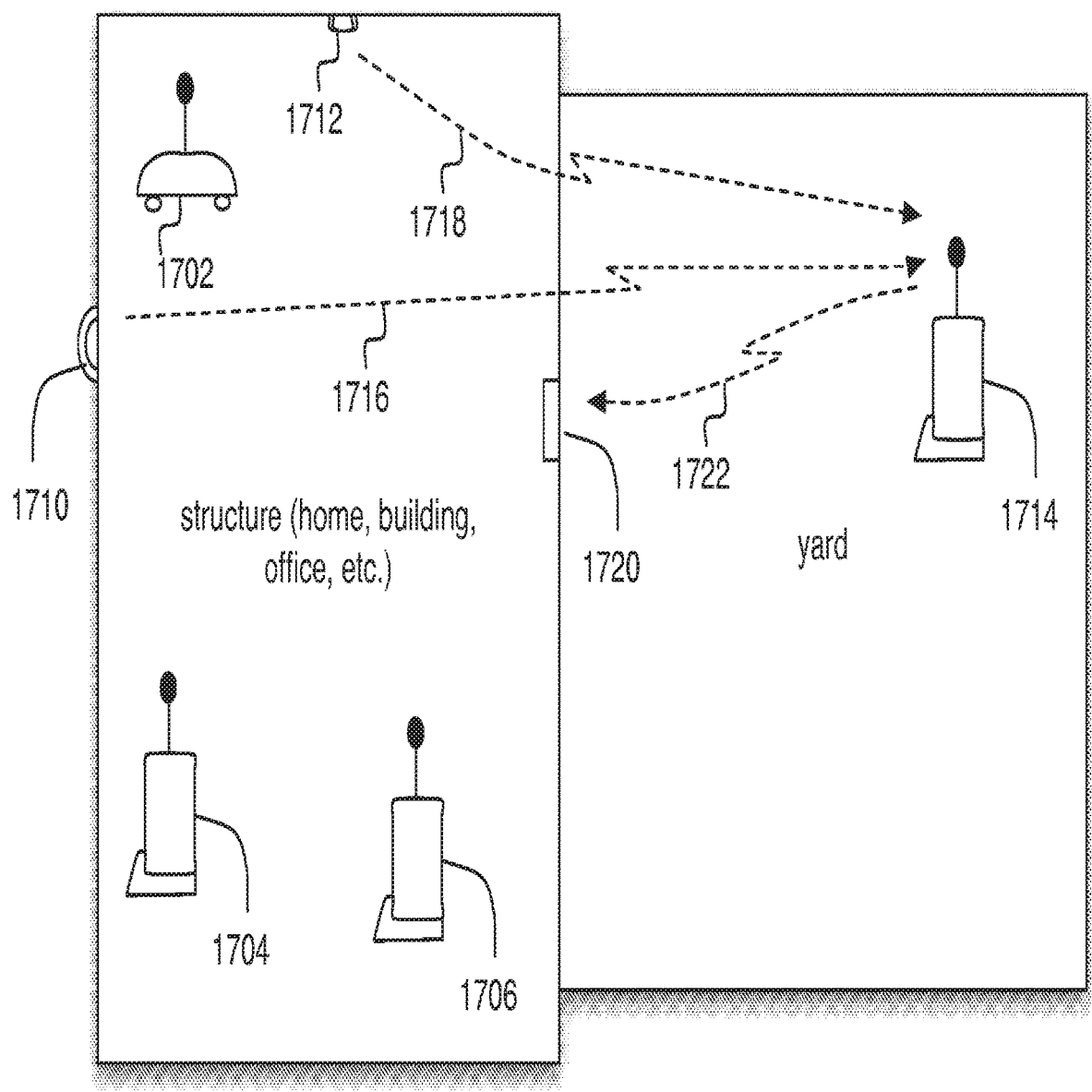
FIGS. 17 and 18 are functional block diagrams of a dog training system according to one embodiment of the invention.

FIG. 17 is a functional block diagram of a dog training system according to one embodiment of the invention. A system shown generally at 1700 includes a target 1702 and dispensers 1704-1706. Target 1702 is configured to communicate with dispensers 1704 and 1706 in a traditional manner as described previously. System 1700 further includes a doorbell 1710 and an alarm 1712 (e.g., fire, smoke, security, gas detector) that are configured to communicate with a dispenser 1714 via wireless communication links 1716 and 1718, respectively. One aspect of the embodiment of FIG. 17 is that dispenser 1714 is configured to generate a dispense signal for a pet upon receiving an associated dispense signal transmitted either by doorbell 1710 or alarm 1712 or motion detector via communication links 1716 or 1718. What is shown as a doorbell 1710 may be a motion detector in place of or in addition to a door bell. In either embodiment, activation prompts transmission of the wireless signal. One purpose of utilizing a system such as that shown in FIG. 17 is to train an animal or dog to exit the structure, which may be a home, building, office, etc., whenever either the doorbell 1710 rings or the alarm 1712 sounds or prior when a motion detector detects someone is walking up. As maybe seen, a dog door 1720 is shown to allow the dog to exit the structure.

In one embodiment, door 1720 is a routine door. In another embodiment, door 1720 includes a motor that is configured to shut the door after the dog has exited the structure to keep the dog from entering. In one particular embodiment, the door closes based on determining that the dog has exited the structure or building shortly after either doorbell 1710 or alarm 1712 has generated wireless communication signal 1716 or 1718. In this embodiment, door 1720 includes circuitry and logic for determining when the dog has exited the structure and circuitry for detecting the transmission of signals 1716 and 1718. For example, door 1720 may include mechanical sensors that can sense which way the dog has traveled (going in or going out). In another embodiment, a dog collar includes electronic circuitry that interacts with door 1720 to allow logic in door 1720 to determine that the dog has exited the structure. For this embodiment, near-field-communications (NFC) circuitry may be embedded in the dog collar.

Figure 18:
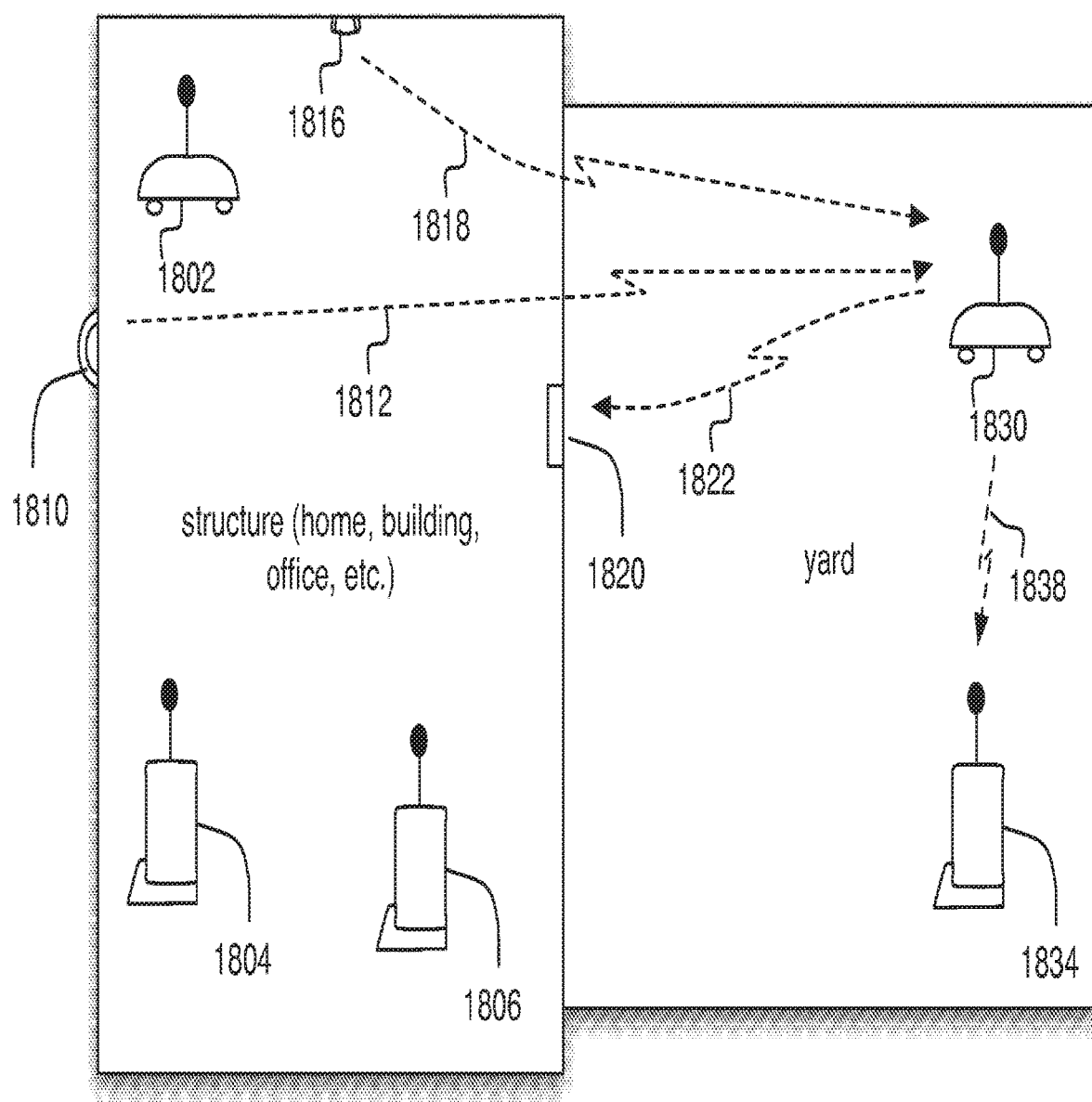

FIG. 18 is a functional block diagram of a dog training system according to one embodiment of the invention. A system shown generally at 1800 includes a target 1802 and dispensers 1804-1806. Target 1802 is configured to communicate with dispensers 1804 and 1806 in a traditional manner as described previously. System 1800 further includes a doorbell 1810 and an alarm 1812 (e.g., fire, smoke, security, gas detector) that are configured to communicate with a target 1830 via wireless communication links 1816 and 1818, respectively. What is shown as a doorbell 1810 may be a motion detector in place of or in addition to a door bell. In either embodiment, activation prompts transmission of the wireless signal. One aspect of the embodiment of FIG. 18 is that target 1830 is configured to generate a signal for a pet upon receiving an associated signal transmitted either by doorbell 1810 or alarm 1812 via communication links 1816 or 1818 to prompt the dog to interact with target 1830. Once the dog has interacted with target 1830, target 1830 generates door lock command 1822 to door 1820 and a dispense command 1838 to dispenser 1834 to issue a treat or reward for the dog. One purpose of utilizing a system such as that shown in FIG. 18 is to train an animal or dog to exit the structure, which may be a home, building, office, etc., whenever either the doorbell 1810 rings or the alarm 1812 sounds.

In one embodiment, door 1820 is a routine door. In another embodiment, door 1820 includes a motor that is configured to shut the door after the dog has exited the structure to keep the dog from entering. In one particular embodiment, the door closes to keep the dog out upon receiving signal 1822 that was transmitted by target 1830.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A system for training an animal, comprising:
    a base comprising a dispenser;
    wherein the dispenser comprises a storage compartment configured to store rewards and to dispense rewards, a base signaling module configured to generate a reward signal, and a base wireless module configured to receive a dispense signal;
    a first target detached from the base at a first target location, wherein the first target location is a first fixed distance from the base, the first target comprising a first target signaling module, a first sensor, and a first target wireless module;
    a second target detached from the base at a second target location, wherein the second target location is a second fixed distance from the base and comprises a second target signaling module, a second sensor, and a second target wireless module;

a system configuration module configured to access and modify configuration information of the dispenser, the first target, and the second target;

wherein the system configuration information comprises a training program, the training program comprising a target activation schedule;

wherein the first sensor and the second sensor are each configured to detect at least one of a plurality of predetermined animal behaviors according to the target activation schedule;

wherein the first target wireless module and the second target wireless module are each configured to transmit a dispense signal to each other in response to a detected predetermined animal behavior; and wherein the dispenser is further configured to generate a reward signal and to dispense a reward only in response to a received dispense signal.

2. The system of claim 1, wherein:
the first sensor further comprises a touch-sensitive area; and
the at least one of a plurality of predetermined animal behaviors comprises touching the touch-sensitive area.

3. The system of claim 1, wherein:
the first sensor further comprises a plurality of touch-sensitive areas; and
the at least one of a plurality of predetermined animal behaviors comprises touching a predetermined first one of the plurality of touch-sensitive areas.

4. The system of claim 1, wherein:
the first sensor further comprises a plurality of touch-sensitive areas; and
the at least one of a plurality of predetermined animal behaviors comprises touching a first one of the plurality of touch-sensitive areas and a second one of the plurality of touch-sensitive areas.

5. The system of claim 1, wherein:
the first sensor further comprises a plurality of touch-sensitive areas; and
the at least one of a plurality of predetermined animal behaviors comprises touching a first one of the plurality of touch-sensitive areas and a second one of the plurality of touch-sensitive areas, in a predetermined order.

6. The system of claim 1, wherein:
the first sensor further comprises an image capture device; and
the at least one of a plurality of predetermined animal behaviors comprises arranging the animal in a predetermined posture.

7. The system of claim 1, wherein:
the first target further comprises a first trigger signal generator configured to generate a first trigger signal; and
the at least one of a plurality of predetermined animal behaviors comprises a predetermined action performed within a predetermined time period beginning at the generation of the first trigger signal.

8. The system of claim 1, wherein:
the second target further comprises a second trigger signal generator configured to generate a second trigger signal; and
wherein the at least one of a plurality of predetermined animal behaviors comprises a predetermined action performed within a predetermined time period beginning at the generation of the second trigger signal.

9. The system of claim 1, wherein:
the first target further comprises a first trigger signal generator configured to generate a first trigger signal; and
the target activation schedule instructs the first target to generate the first trigger signal within a predetermined time period relative to the second sensor detecting at least one of a plurality of predetermined animal behaviors.

10. The system of claim 1, wherein the target activation schedule indicates manual activation based on input received from a user.

* * * * *